(12) United States Patent
Asari et al.

(10) Patent No.: US 7,438,482 B2
(45) Date of Patent: Oct. 21, 2008

(54) CELL, PACKAGING SYSTEM, AND METHOD FOR FABRICATING THE PACKAGING SYSTEM

(75) Inventors: Takuma Asari, Hyogo (JP); Daniel Hogan, Acton, MA (US)

(73) Assignee: Matsushita Electric Industrial Co. Ltd., Osaka (JP)

( * ) Notice: Subject to any disclaimer, the term of this patent is extended or adjusted under 35 U.S.C. 154(b) by 97 days.

(21) Appl. No.: 11/189,673

(22) Filed: Jul. 26, 2005

(65) Prior Publication Data

US 2005/0259925 A1    Nov. 24, 2005

Related U.S. Application Data

(63) Continuation-in-part of application No. 10/812,122, filed on Mar. 29, 2004, now abandoned, and a continuation-in-part of application No. PCT/JP2005/005779, filed on Mar. 28, 2005.

(51) Int. Cl.
*G02B 6/36* (2006.01)
*H01R 13/28* (2006.01)

(52) U.S. Cl. .................................... 385/89; 439/284

(58) Field of Classification Search ................ None
See application file for complete search history.

(56) References Cited

U.S. PATENT DOCUMENTS

| | | | |
|---|---|---|---|
| 4,931,021 A * | 6/1990 | Mohan | 439/285 |
| 5,183,409 A * | 2/1993 | Clever et al. | 439/291 |
| 5,531,022 A | 7/1996 | Beaman et al. | |
| 5,637,907 A | 6/1997 | Leedy | |
| 5,848,214 A | 12/1998 | Haas et al. | |
| 6,095,698 A * | 8/2000 | Strab et al. | 385/88 |
| 6,268,238 B1 | 7/2001 | Davidson et al. | |
| 6,304,690 B1 | 10/2001 | Day | |
| 6,320,257 B1 | 11/2001 | Jayaraj et al. | |
| 6,341,899 B1 * | 1/2002 | Shirakawa et al. | 385/88 |
| 6,396,967 B1 | 5/2002 | Suzuki et al. | |
| 6,426,559 B1 | 7/2002 | Bryan et al. | |
| 6,451,634 B2 | 9/2002 | Ma et al. | |
| 6,860,647 B2 | 3/2005 | Yamabayashi et al. | |
| 2004/0240485 A1 * | 12/2004 | Lipski et al. | 370/537 |

FOREIGN PATENT DOCUMENTS

| | | |
|---|---|---|
| CA | 2320682 A1 * | 3/2002 |
| JP | 6-59302 | 3/1994 |
| JP | 2003-161864 | 6/2003 |
| JP | 2003-185888 | 7/2003 |

\* cited by examiner

*Primary Examiner*—Hemang Sanghavi
*Assistant Examiner*—Omar Rojas
(74) *Attorney, Agent, or Firm*—RatnerPrestia

(57) ABSTRACT

The present invention provides cells which are capable of transmitting both optical information and electrical signals when connected with each other, and a packaging system in which these cells are connected. A first connector and a second connector are formed on each cell. These two connectors are configured complementary to each other. When two cells are pressed against each other with the first connector of one of the cells facing the second connector of the other, electrical connectors engage with each other, whereby the cells are connected electrically and mechanically. A first optical device and a second optical device are also disposed in complementary positions. When the cells are connected electrically and mechanically, the tip of the first optical device and the tip of the second optical device are brought into contact with each other, allowing an optical signal to be transmitted.

23 Claims, 12 Drawing Sheets

CELL, PACKAGING SYSTEM, AND METHOD FOR FABRICATING THE PACKAGING SYSTEM

This application is a Continuation-In-Part of U.S. patent application Ser. No. 10/812,122 filed Mar. 29, 2004 now abandoned and of International Application No. PCT/JP2005/005779, filed Mar. 28, 2005 (pending).

BACKGROUND OF THE INVENTION (a) Field of the Invention

The present invention relates to a cell, a packaging system, and a method for fabricating the packaging system, and more particularly relates to a cell and a packaging system for transmitting optical information by using an interconnect system, and to a method for fabricating the packaging system.

(b) Background Art

Today, in order to reduce manufacturing costs and increase performance of computers, there is a growing need for compact arrangements of electronic circuits. To that end, the area dedicated to electronic circuitry is minimized, while the distance over which electrical signals must propagate is reduced, as are the material costs. For example, Patent Document 1 discloses a multichip package, in which four semiconductor chips, stacked directly or with gold balls interposed therebetween, are mounted on a lead frame and then encapsulated, thereby reducing the distance between the semiconductor chips.

Another technology has also been developed, in which optical signals, instead of electrical signals, are used to operate electronic circuits or to transmit information among the electronic circuits. This kind of technology has been vigorously developed in recent years, because optical signals travel faster and carry a greater amount of information than electric signals. For example, Patent Document 2 discloses a multichip module, in which a plurality of substrates having integrated circuits mounted thereon are stacked with a resin interposed between the substrates for bonding thereof. In this multichip module, optical fibers are embedded in the resin interposed between the substrates to provide interconnection for the integrated circuits.

Patent Document 1: U.S. Pat. No. 6,426,559
Patent Document 2: U.S. Pat. No. 5,848,214

SUMMARY OF THE INVENTION

However, in the multichip package described in Patent Document 1, electrical-signal transmission between the chips inside the package is carried out fast, but signal transmission to/from integrated circuits external to the package is performed in a conventional manner, such that the entire system incorporating this package cannot expect a large increase in the speed of electrical-signal transmission. Also, in the multichip module described in Patent Document 2, the optical fibers allow optical-signal transmission between the chips inside the module to be performed at high speed, but signal transmission to/from external integrated circuits connected to the module is conducted in a conventional way. Therefore, the entire system incorporating this module cannot always achieve a substantial increase in the signal transmission speed.

Moreover, an information network in a robot or the like, which corresponds to the nervous system of a human, requires high-speed signal transmission, arbitrary rearrangement of the connection, processing of multiple signals within the network, and the like. Nevertheless, such a network is not available at present, and it is very difficult to form such an information network by using the package and the module disclosed in Patent Documents 1 and 2.

The present invention was made in view of the above, and it is therefore an object of the present invention to provide cells which are capable of transmitting both optical information and electrical signals when the cells are connected to each other, and a packaging system in which these cells are connected.

A first inventive cell for transmitting optical information includes a body and an interconnect system protruding from the body, wherein the interconnect system includes a first connector and a second connector that are complementary to each other; the first connector includes a first electrical connector and a first optical device; the second connector includes a second electrical connector complementary to the first electrical connector and a second optical device disposed in a position complementary to the first optical device; and the first optical device is a light emitting device and the second optical device is a light receiving device. Since the inventive cell is thus configured, if a plurality of such cells are prepared, these cells are connected with each other by their interconnect systems. By theses connections, the cells are electrically and optically coupled to each other in a complementary manner. Herein, the term "being complementary" means that two specific things make a pair in a specific manner. By making a pair in a complementary manner, the cells can complement each other and interact with each other.

A second inventive cell for transmitting optical information includes a body and an interconnect system protruding from the body, wherein the interconnect system includes a first connector and a second connector that are complementary to each other; the first connector includes a plurality of first electrical connectors and a plurality of first optical devices; the second connector includes a plurality of second electrical connectors complementary to the first electrical connectors and a plurality of second optical devices disposed in positions complementary to the first optical devices; and the first and second optical devices include light emitting devices and light receiving devices.

The interconnect system preferably extends from the exterior of the body of the cell outwardly of, and inwardly into, the body In one embodiment, the body has a polyhedral structure, and the first and second connectors are provided on a first face and a second face of the body, respectively, and the interconnect system further includes a third connector and a fourth connector provided on a third face and a fourth face of the body, respectively, the third and fourth connectors being complementary to each other. With this configuration, the cells can be connected to extend in two directions.

In one embodiment, the cell further includes a fifth connector and a sixth connector provided on a fifth face and a sixth face of the body, respectively, the fifth and sixth connectors being complementary to each other. With this configuration, the cells can be connected to extend in three directions.

In one embodiment, the first and second connectors include a plurality of projections protruding from the exterior of the body and a plurality of recesses that are surrounded by the projections and depressed relatively; the projections and the recesses are arranged to form checkered patterns on the exterior of the body on which the first and second connectors are provided; the first optical devices includes one disposed in the tip of at least one of the projections of the first connector and one disposed in the bottom of at least one of the recesses of the first connector; and the second optical devices include one disposed in the tip of at least one of the projections of the second connector and one disposed in the bottom of at least one of the recesses of the second connector.

In one embodiment, the first optical device disposed in the tip of said at least one projection of the first connector is a light emitting device, and the second optical device disposed in the bottom of said at least one recess of the second connector is a light receiving device.

In one embodiment, the first optical device disposed in the tip of said at least one projection of the first connector is a light receiving device, and the second optical device disposed in the bottom of said at least one recess of the second connector is a light emitting device.

In one embodiment, the first optical device disposed in the tip of said at least one projection of the first connector is at least a pair of a light emitting device and a light receiving device, and the second optical device disposed in the bottom of said at least one recess of the second connector is at least a pair of a light receiving device and a light emitting device.

In one embodiment, the body has a polyhedral structure, and the first and second connectors are provided on a first face and a second face of the body, respectively; the interconnect system further includes a third connector and a fourth connector provided on a third face and a fourth face of the body, respectively, the third and fourth connectors being complementary to each other; the third and fourth connectors include a plurality of projections protruding from the exterior of the body and a plurality of recesses that are surrounded by the projections and depressed relatively; and the projections and the recesses of the third and fourth connectors are arranged to form checkered patterns on the exterior of the body on which the third and fourth connectors are provided.

In one embodiment, the cell further includes a fifth connector and a sixth connector provided on a fifth face and a sixth face of the body, respectively, the fifth and sixth connectors being complementary to each other; the fifth and sixth connectors include a plurality of projections protruding from the exterior of the body and a plurality of recesses that are surrounded by the projections and depressed relatively; and the projections and the recesses of the fifth and sixth connectors are arranged to form checkered patterns on the exterior of the body on which the fifth and sixth connectors are provided.

A first inventive packaging system includes at least two cells for transmitting optical information, wherein each of the cells includes at least one first connector and at least one second connector complementary to the first connector; the cells are connected by a coupling between the first connector and the second connector; and the connection established between the cells allows the two adjacent cells to be coupled mechanically, electrically, and optically. By connecting the cells, the optical/electrical coupling extends.

The cells are preferably connected detachably. Then, the configuration of the packaging system can be changed freely by connecting and disconnecting the cells.

In one embodiment, the cells are connected to be arranged two-dimensionally.

In one embodiment, the cells are connected to be arranged three-dimensionally.

Preferably, the first connector includes a first electrical connector and the second connector includes a second electrical connector, and the cells are also mechanically coupled by the first and second electrical connectors.

The first connector preferably includes a first optical device array and the second connector preferably includes a second optical device array; each of the first and second optical device arrays preferably includes a light emitting device and a light receiving device; and the first and second optical device arrays are preferably arranged so that the light emitting device of the first optical device array of one of the cells transmits optical information to the light receiving device of the second optical device array of the other cell, and the light emitting device of said second optical device array transmits optical information to the light receiving device of said first optical device array, whereby optical information transmission is carried out between said one cell and said the other cell.

In one embodiment, the light emitting device of the first optical device array of said one cell is spaced apart from the light receiving device of the second optical device array of said the other cell, and the light emitting device of the second optical device array of said the other cell is spaced apart from the light receiving device of the first optical device array of said one cell.

Each space is preferably from 0 mm to 50 mm.

A second inventive packaging system includes a plurality of cells for transmitting optical information, wherein the cells are detachably connected to each other; the cells each include electrical coupling means for electrically connecting the cells and optical coupling means for optically coupling the cells; and some of the connections established between adjacent pairs of the cells provide an optical coupling, while the other connection or connections provide no optical coupling.

A first inventive method is a method for fabricating a packaging system by connecting a plurality of cells for transmitting optical information, each cell including a body and an interconnect system protruding from the body, wherein the interconnect system includes a first connector and a second connector that are complementary to each other, the first connector includes a first electrical connector and a first optical device, the second connector includes a second electrical connector complementary to the first electrical connector and a second optical device disposed in a position complementary to the first optical device, and the first optical device is a light emitting device and the second optical device is a light receiving device. The first inventive method includes the steps of: disposing a first one and a second one of the cells so that the first connector of the first cell faces the second connector of the second cell; and detachably engaging the first connector of the first cell with the second connector of the second cell, thereby coupling the first and second connectors.

A second inventive method is a method for fabricating a packaging system by connecting a plurality of cells for transmitting optical information, each cell including a body and an interconnect system protruding from the body, wherein the interconnect system includes a first connector and a second connector that are complementary to each other, the first connector includes a plurality of first electrical connectors and a plurality of first optical devices, the second connector includes a plurality of second electrical connectors complementary to the first electrical connectors and a plurality of second optical devices disposed in positions complementary to the first optical devices, and the first and second optical devices include light emitting devices and light receiving devices. The second inventive method includes the steps of: disposing a first one and a second one of the cells so that the first connector of the first cell faces the second connector of the second cell; and detachably engaging the first connector of the first cell with the second connector of the second cell, thereby coupling the first and second connectors.

A plurality of cells are connected by their interconnect systems, and this connection allows the cells to be electrically and optically coupled to each other in a complementary manner. Thus, just by connecting the cells, electrical and optical information transmission can be performed between the cells.

The present invention provides an integrated circuit module comprising an interconnect system extending from the exterior of the module. The interconnect system comprises a first connector and a second connector, wherein the first and second connectors are complementary connectors. The first connector comprises a first electrical connector and a first optical device, and the second connector comprises a second electrical connector complementary to the first electrical connector and a second optical device complementary to the first optical device. The first and second optical devices each comprise optical emitters and detectors.

In one embodiment of the invention, the integrated circuit module comprises third and fourth connectors, and the third and fourth connectors are complementary. In still another embodiment of the invention, the module further comprises a fifth and a sixth connectors, and the fifth and sixth connectors are complementary.

The present invention also provides an integrated circuit packaging apparatus comprising at least two integrated circuit modules. The modules are connected via an attachment between a first connector and a second connector, and each module comprises at least one first connector and at least one second connector. The first connector on a module adapted to form an attachment with the second connector on an adjacent module, the attachment providing a mechanical, an electrical, and an optical connection between the module and the adjacent module.

The present invention also provides a method of assembling an integrated circuit apparatus comprising interchangeably attaching at least two integrated circuit modules. In one embodiment, the method of assembling an integrated circuit apparatus comprises interchangeably attaching integrated circuit modules to form a two-dimensional array of interconnected integrated circuit modules. In another embodiment, the method comprises interchangeably attaching integrated circuit modules to form a three-dimensional array of interconnected integrated circuit modules.

BRIEF DESCRIPTION OF THE DRAWINGS

FIG. 1A is a perspective view schematically illustrating a cell according to a first embodiment as viewed obliquely from the front, while

FIG. 4A is a perspective view schematically illustrating a cell according to a second embodiment, while

DETAILED DESCRIPTION OF THE INVENTION

Figure 1A:
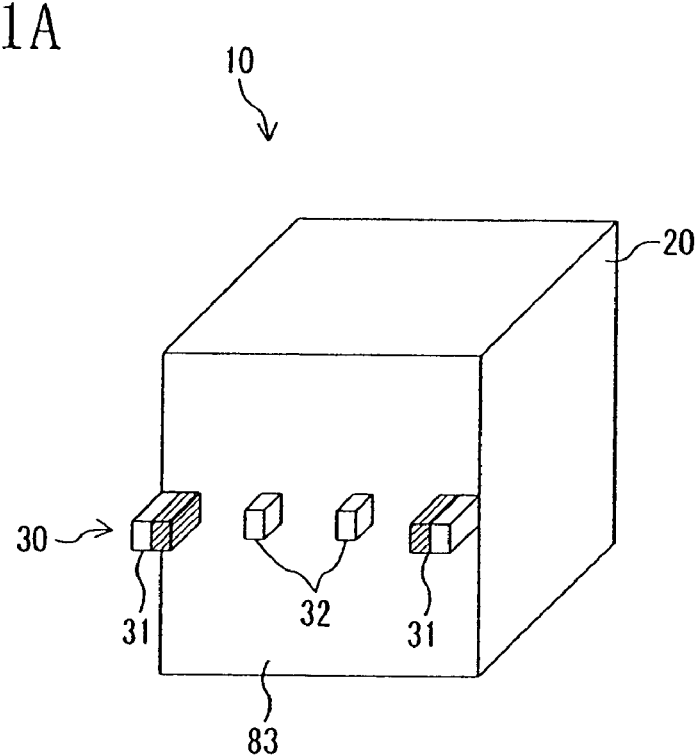

Hereinafter, preferred embodiments of the present invention will be described in detail with reference to the accompanying drawings. The following embodiments are given as examples, and the present invention is not limited to these examples. Also, the components having substantially the same functions are identified by the same reference numerals.

First Embodiment

A cell according to a first embodiment is interconnected to a plurality of cells of the same kind or to a plurality of cells of different kinds having different configurations, for transmission of optical information between the interconnected cells.

Figure 1B:
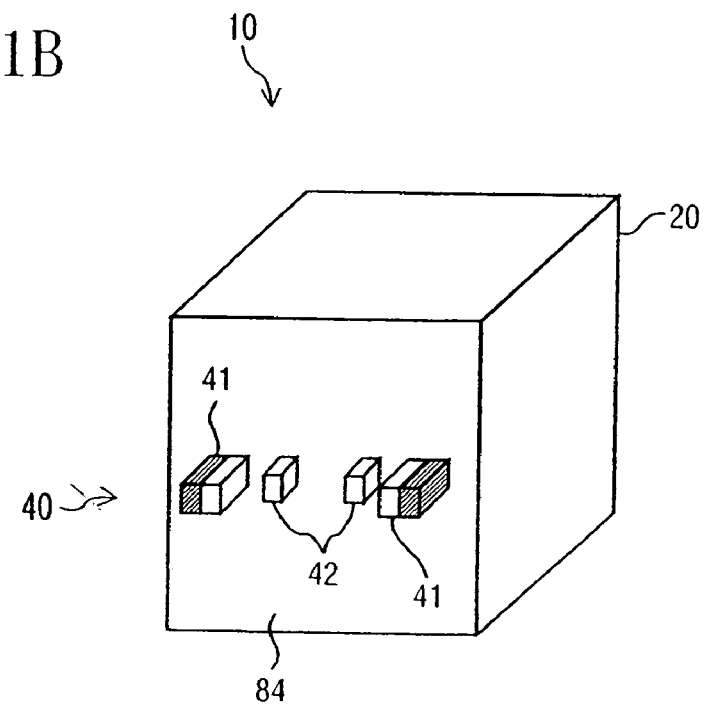
FIG. 1B is a perspective view schematically illustrating the cell as viewed obliquely from the back.
Figure 2:
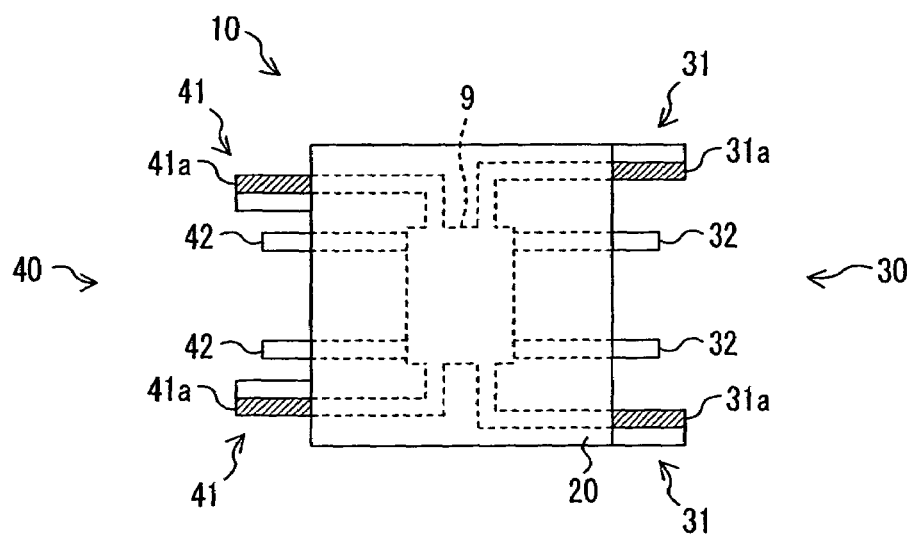
FIG. 2 is a top view schematically illustrating the cell of the first embodiment.
Figure 3:
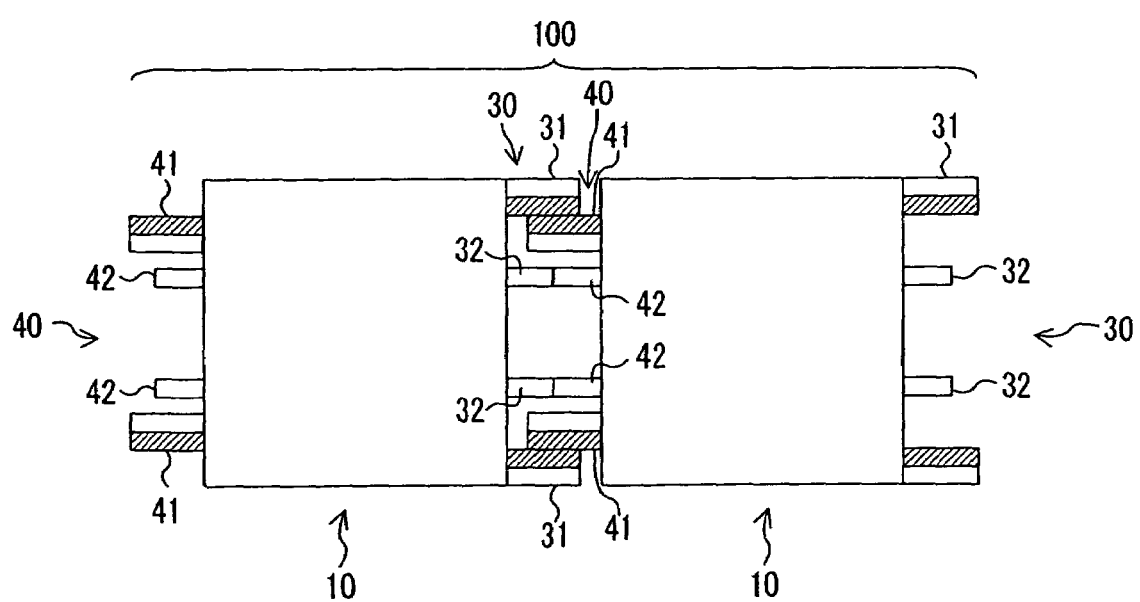
FIG. 3 is a top view schematically illustrating a packaging system according to the first embodiment.

The cell of this embodiment is approximately cubic in shape, and as schematically shown in FIGS. 1 and 2, a first connector 30 and a second connector 40 are provided on a pair of parallel faces, respectively. FIGS. 1A and 1B are schematic perspective views of the cell 10 of this embodiment. FIG. 2 is a top view of the cell 10 as seen from above. FIG. 1A is a view of the cell 10 as seen obliquely from the front, while FIG. 1B is a view of the cell 10 as seen obliquely from the back. Although some portions in FIGS. 1 through 3 are marked by hatching for the sake of clarity of the figures, the hatched portions do not indicate cross sections.

The connectors 30 and 40 protrude outwardly from the outer walls 83 and 84 of a cubic body 20 made of a synthetic resin, while they also extend inwardly and are embedded in the body 20. The first and second connectors 30 and 40 form an interconnect system. Within the body 20, an integrated circuit 9 is also embedded and connected with the connectors 30 and 40 extending into the body 20.

The first connector 30 includes first electrical connectors 31 and 31 and first optical devices 32 and 32, while the second connector 40 includes second electrical connectors 41 and 41 and second optical devices 42 and 42. The first optical devices 32 and 32 are light emitting diodes serving as light emitting devices, while the second optical devices 42 and 42 are photosensors acting as light receiving devices. The first electrical connectors 31 and 31 and the second electrical connectors 41 and 41 each have the shape of a rectangular prism. Although not shown, a driving device for driving the light emitting devices is buried in the body 20. The light emitting devices, the light receiving devices, and the integrated circuit 9 are connected by optical fibers.

The first electrical connectors 31 and 31 and the first optical devices 32 and 32 are arranged in a straight line on the face 83 of the body 20 that has the first connector 30 formed thereon. This straight line, extending in parallel with sides of the face 83 of the square body 20, divides the face 83 into two equal parts. The first electrical connectors 31 and 31 are disposed respectively in contact with two opposing sides of the square face 83 of the body 20, with the first optical devices 32 and 32 provided between the two first electrical connectors 31 and 31.

The second electrical connectors 41 and 41 and the second optical devices 42 and 42 are also arranged in a straight line on the face 84 of the body 20 that has the second connector 40 formed thereon. However, the second connector 40 differs from the first connector 30 in that the second electrical connectors 41 and 41 are disposed at a distance from the sides of the square face 84 of the body 20. In the other aspects, the arrangement of the second connector 40 is the same as that of the first connector 30. The straight line in which the first electrical connectors 31 and 31 and the first optical devices 32 and 32 are arranged is in parallel with the line in which the second electrical connectors 41 and 41 and the second optical devices 42 and 42 are arranged.

Next, two cells 10 thus configured are prepared and connected as shown in FIG. 3. In FIG. 3, the internal configurations of the cells 10 are not illustrated. The plurality of cells 10 connected in this manner will be hereinafter referred to as a "packaging system 100". The connection between the cells 10 is made as follows. First, the first connector 30 of one cell 10 is placed facing the second connector 40 of the other cell 10. The both cells 10 and 10 are then pressed to each other, whereby the first connector 30 and the second connector 40 engage with each other, allowing the cells 10 and 10 to be connected.

Since the first connector 30 and the second connector 40 are formed complementary to each other, they are engaged and interlocked just by pressing the cells to each other. More specifically, the two second electrical connectors 41 and 41 are respectively brought into contact with the opposing faces of the two first electrical connectors 31 and 31. This contact between the first electrical connectors 31 and 31 and the second electrical connectors 41 and 41 allows the first connector 30 and the second connector 40 to be coupled and fixed to each other. In other words, the first electrical connectors 31 and 31 have the second electrical connectors 41 and 41 engaged therebetween, thereby mechanically fixing the second electrical connectors 41 and 41. When the first electrical connectors 31 and 31 and the second electrical connectors 41 and 41 make contact with each other, electrical connection is also established therebetween. The first electrical connectors 31 and 31 and the second electrical connectors 41 and 41 have conductive members 31a and 41a (e.g., copper, gold, aluminum, or the like) as their respective contact faces, thereby accomplishing the electrical connection therebetween, while the portions thereof that are opposite to their contact faces are made of a synthetic resin.

In the connection thus established, the first and second connectors 30 and 40 are interlocked by static friction occurring between the first electrical connectors 31 and 31 and the second electrical connectors 41 and 41. Thus, it is possible to separate the two connectors 30 and 40, if the interlock is released using a force greater than the static friction. In other words, the cells 10 and 10 are connected by the detachable engagement. In order to facilitate the coupling between the two connectors 30 and 40, the second electrical connectors 41 and 41 each have a beveled rounded edge at their tip on the side thereof on which the conductive member 41a is disposed. The distance between the outer walls of the two second electrical connectors 41 and 41 is set slightly greater than the distance between the inner walls of the two first electrical connectors 31 and 31, whereby the first electrical connectors 31 and 31 and the second electrical connectors 41 and 41 are pressed against each other by the elastic force, and thus joined firmly.

When the first and second connectors 30 and 40 are connected in the above-described manner, the first optical devices 32 and 32 and the second optical devices 42 and 42 face each other with their tips being in contact with each other. That is, the second optical devices 42 and 42 are disposed in the positions complementary to the first optical devices 32 and 32. One of the first optical devices 32 faces a corresponding one of the second optical devices 42, and an optical signal produced from the first optical device 32 enters the corresponding second optical device 42, whereby the optical information is transmitted. In the pair of the other first optical device 32 and the other second optical device 42, optical information transmission is also performed likewise. In this embodiment, the first optical devices 32 and 32 and the second optical devices 42 and 42 are in contact with each other, which minimizes EMI (electromagnetic interference) and crosstalk, as compared with cases in which they are disposed spaced apart from each other. Therefore, the arrangement of the first optical devices 32 and 32 and the second optical devices 42 and 42 of this embodiment is preferable.

When the two cells 10 and 10 are connected as shown in FIG. 3, electrical signals, power, and optical signals are transmitted between these cells 10 and 10. Electrical signals and power are transmitted between the first electrical connectors 31 and 31 and the second electrical connectors 41 and 41, while optical signal transmission is carried out between the first optical devices 32 and 32 and the second optical devices 42 and 42. These electrical signals, power, and optical signals are guided into the integrated circuit 9 in the body 20, where the information is converted or not converted, and is then transmitted. It should be noted that at least part of the electrical signals, power, and optical signals may be directly transmitted to the adjacent cell 10, without passing through the integrated circuit 9.

The cell, the packaging system, and the packaging system fabrication method of this embodiment provide the following effects.

The cells and the packaging system, having simple configurations, are capable of transmitting both electrical/power signals and optical signals. The first electrical connectors 31 and 31 and the second electrical connectors 41 and 41 are formed complementary to each other in terms of their shape and position. The first optical devices 32 and 32 and the second optical devices 42 and 42 are also formed complementary to each other in terms of their shape and position. Therefore, when the first and second connectors 30 and 40 disposed in face-to-face relation are simply pressed against each other for the fit and engagement therebetween, an electrical and an optical coupling are accomplished automatically. Also, since the first and second connectors 30 and 40 are coupled by the detachable engagement, the cells in the packaging system can be rearranged readily, enabling easy upgrade of the cells. In addition, the electrical connectors 31 and 41 provide both the electrical and mechanical connections, such that the first and second connectors 30 and 40 have the simple configuration.

Although the two first optical devices 32 and 32 and the two second optical devices 42 and 42 are provided in this embodiment, one first optical device 32 and one second optical device 42 may be provided, or alternatively, three or more first optical devices 32 and three or more second optical devices 42 may be provided.

Second Embodiment

Like the cell of the first embodiment, a cell according to a second embodiment is connected to a plurality of cells of the same kind or to a plurality of cells of different kinds having different configurations, for transmission of optical information between the connected cells.

The cell of this embodiment is similar to the cell of the first embodiment in the overall shape and function, but differs from the cell of the first embodiment in the number of connectors, the numbers and locations of electrical connectors and optical devices, and the like. Therefore, these differences will be mainly described in the following.

Figure 4A:
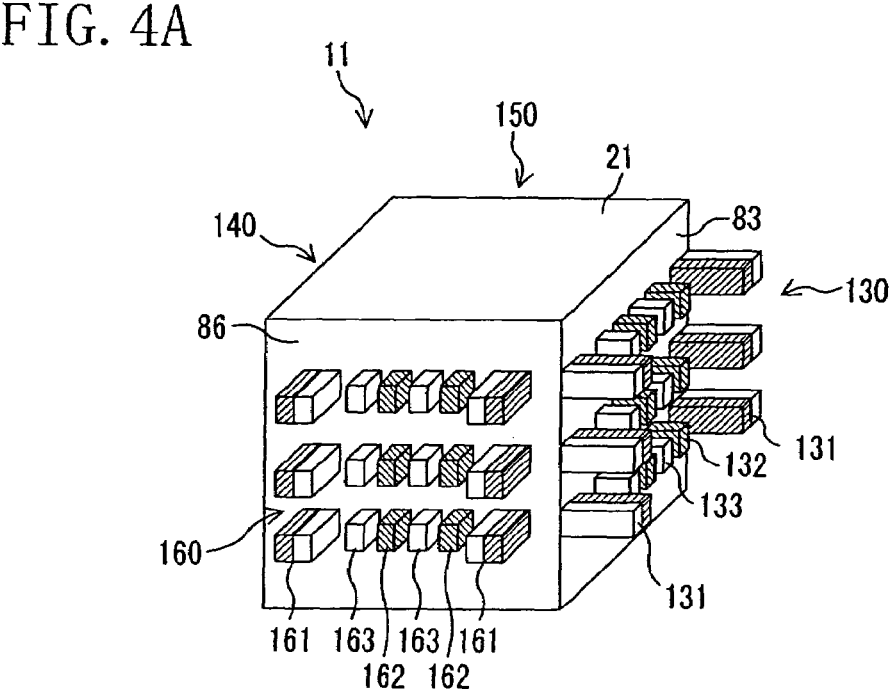
Figure 4B:
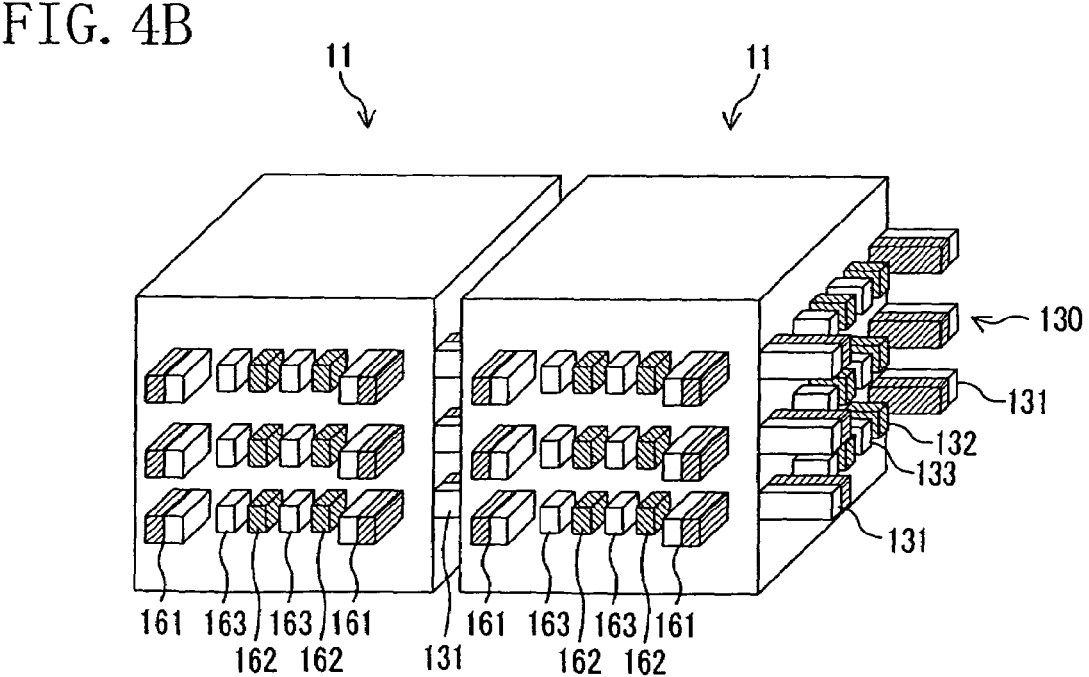
FIG. 4B is a perspective view schematically illustrating how two cells are connected.
Figure 5:
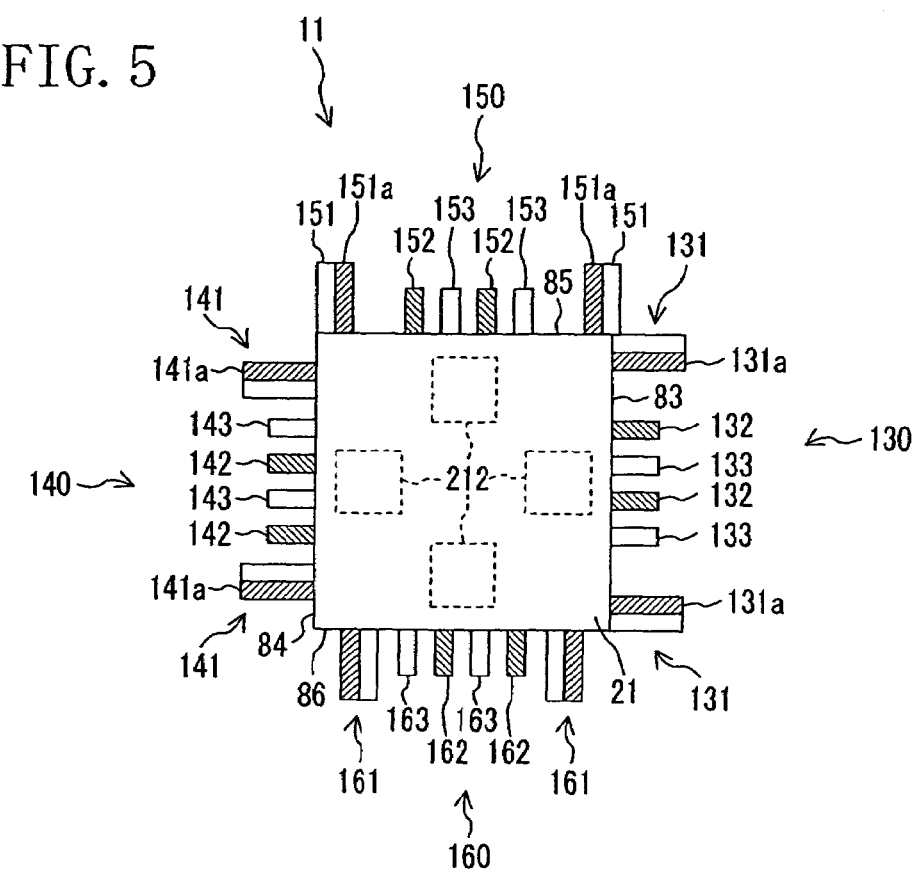
FIG. 5 is a top view schematically illustrating the cell of the second embodiment.
Figure 6:
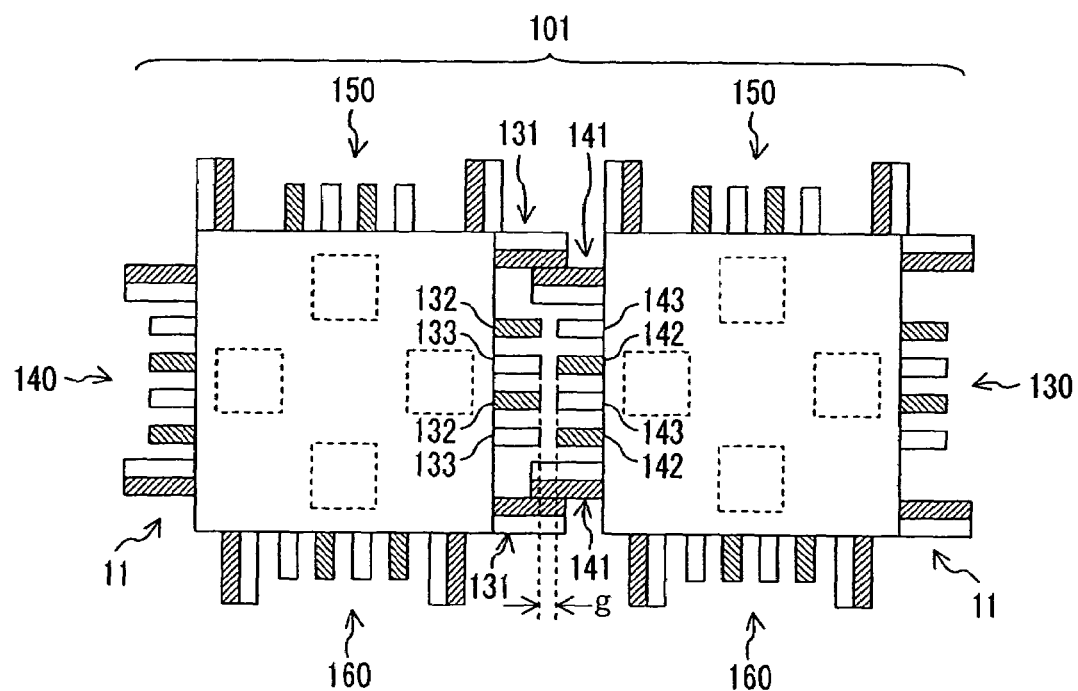
FIG. 6 is a top view schematically illustrating a packaging system according to the second embodiment.

FIG. 4A is a perspective view illustrating a cell 11 according to this embodiment. FIG. 5 is a top view of the cell 11 of FIG. 4A, as seen from above. Although some portions in FIGS. 4 through 6 are marked by hatching for clearer illustration, the hatched portions do not indicate cross sections. As can be seen from these figures, the cell 11 of this embodiment has four connectors 130, 140, 150, and 160 formed respectively on four faces 83, 84, 85, and 86 of a cubic body 21. The first connector 130 and the third connector 150 have the same configuration and shape, and the second connector 140 and the fourth connector 160 have the same configuration and shape. Thus, the first and second connectors 130 and 140 will be described below. The first connector 130 is formed on the face 83 of the body 21, which is opposite to the face 84 where the second connector 140 is formed. The third connector 150 is formed on the face 85 of the body 21, which opposes the face 86 where the fourth connector 160 is formed. These four connectors 130, 140, 150, and 160 form an interconnect system.

The first difference between the first and second connectors 130 and 140 of this embodiment and the first and second connectors 30 and 40 of the first embodiment is as follows: in the first embodiment, the two electrical connectors and the two optical devices are arranged in a straight line to form the single connector, whereas in this embodiment, three parallel lines, in each of which four optical devices are arranged between two electrical connectors, form a single connector. These electrical connectors and optical devices are arranged to be complementary to each other as shown in FIGS. 4B and 6, whereby electrical connection and optical connection are reliably established when the first and second connectors 130 and 140 are coupled to each other. Also, when the first and second connectors 130 and 140 are coupled, it is possible to transmit a number of electrical signals and optical signals simultaneously. In this respect, the second embodiment differs from the first embodiment. More specifically, in the first embodiment, two electrical signals and two optical signals are transmitted when the first and second connectors 30 and 40 are connected. However, in this embodiment, six electrical signals and twelve optical signals are transmitted, which means that the amount of information transmission is 4.5 times that of the first embodiment.

The second difference between the first and second embodiments is that in the second embodiment, the first optical devices 132, 133 of the first connector 130 include both light receiving devices 132 and light emitting devices 133 and form a first optical-device array. The second through fourth optical devices likewise form second through fourth optical-device arrays. Since the light receiving devices 132 and the light emitting devices 133 are both included, bidirectional transmission of optical information is possible between the two coupled cells 11.

Moreover, in this embodiment, a plurality of integrated circuits 212, 212, . . . are embedded in the body 21 and connected with first electrical connectors 131, second electrical connectors 141, third electrical connectors 151, fourth electrical connector 161, the first optical devices 132 and 133, the second optical devices 142 and 143, the third optical devices 152 and 153, and the fourth optical devices 162 and 163.

A method for fabricating a packaging system 101 by coupling two cells 11 and 11 is also the same as the method of the first embodiment. In fabricating the packaging system 101, each cell 11 is placed on a workbench with a face of its body 21, on which no connector is formed, being in contact with the top surface of the workbench. Then, the first connector 130 of one cell 11 is made to face the second connector 140 of the other cell 11, and these cells 11 and 11 are slid on the workbench and pressed against each other, whereby all of the electrical connectors 131 and 141 and optical devices 132, 133, 142, and 143 are connected. The third and fourth connectors 150 and 160 are also connected in the same manner, whereby all of the electrical connectors 151, 161, and optical devices 152, 153, 162, and 163 are connected properly. As in the first embodiment, the coupling between the first and second connectors 130 and 140 and the coupling between the third and fourth connectors 150 and 160 are accomplished by the detachable engagement.

Unlike the packaging system of the first embodiment, in the packaging system 101 of this embodiment, the tips of the first optical devices 132 and 133 are not in contact with the tips of the second optical devices 142 and 143, with a gap g existing therebetween. Although the presence of the gap g is slightly unfavorable for transmission of optical signals, the gap g avoids contact between the first optical devices 132 and 133 and the second optical devices 142 and 143 even if some size errors or misalignments occur in the fabrication of the cells 11, thereby preventing the contact portions, which would be otherwise created, from being damaged by a large force.

The cells, the packaging system, and the packaging system fabrication method of this embodiment provide the following effects in addition to the effects described in the first embodiment.

The effects achievable by the coupling of the first and second connectors 130 and 140 are also obtained by coupling the third and fourth connectors 150 and 160. A variety of optical signals and electrical signals can be transmitted between two adjacent cells. Furthermore, bidirectional optical-signal transmission can be carried out between the connected cells. Moreover, up to four cells can be connected to one cell 11.

Third Embodiment

Figure 7:
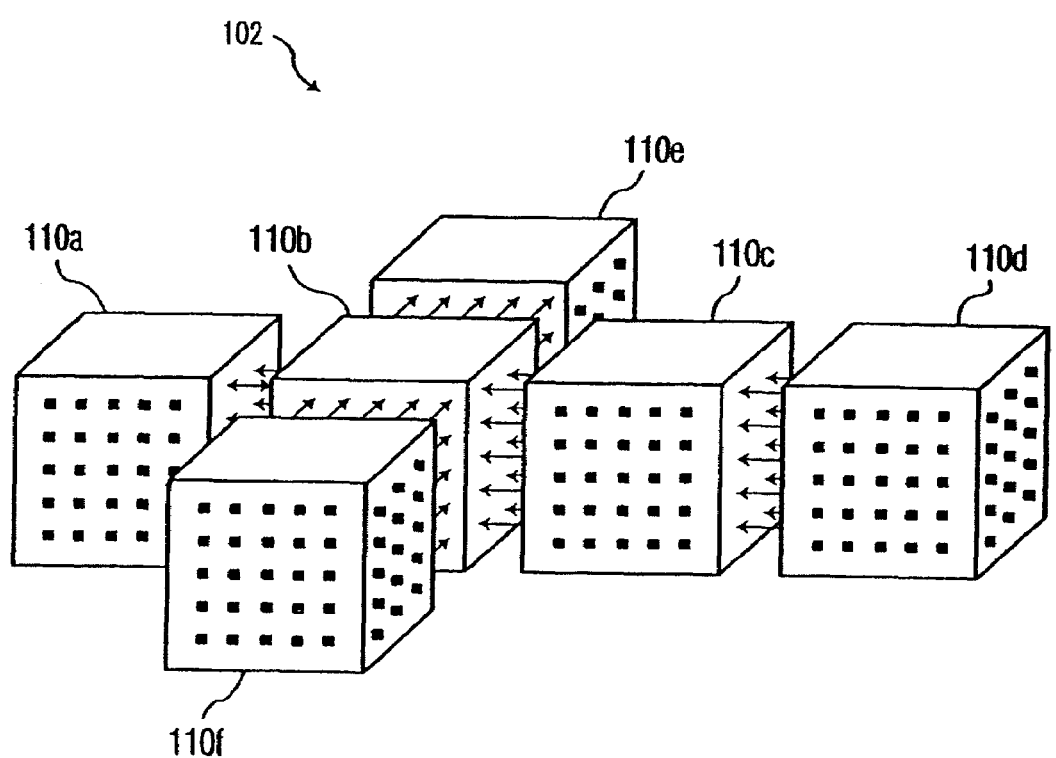
FIG. 7 is a perspective view schematically illustrating a packaging system according to a third embodiment.

FIG. 7 is a perspective view schematically illustrating a packaging system 102 according to a third embodiment. The packaging system 102, which uses cells 110a, 110b, . . . similar to the cell of the second embodiment, extends horizontally. In the cells 110a, 110b, . . . used in this embodiment, electrical connectors and optical devices (optical device arrays), which are arranged in five lines, form a single connector.

The packaging system 102 of this embodiment is formed by connecting the six cells 110a, 110b, . . ., with the cell 110b being the center. The four cells 110a to 110d are connected linearly by their first connectors and second connectors in the side-to-side direction in the figure. In addition, the fourth connector of the cell 110b is coupled to the third connector of the cell 110f, and the third connector of the cell 110b is coupled to the fourth connector of the cell 110e, whereby the cells 110*b*, 110*e* and 110*f* are connected together orthogonally with respect to the line formed by the four cells 110*a*, 110*b*, 110*c* and 110*d*.

Like the cells described in the first and second embodiments, the cells 110*a*, 110*b*, . . . of this embodiment are detachably engaged and thereby connected with each other, such that any of the cells 110*a*, 110*b*, . . . can be removed easily for replacement with another cell.

The cells, the packaging system, and the packaging system fabrication method of this embodiment provide the following effects in addition to the effects described in the second embodiment.

Since the plurality of cells 110*a*, 110*b*, . . . are arranged two-dimensionally to extend in the same plane, with the central cell 110*b* being the center, the packaging system 102 of this embodiment is capable of transmitting electrical signals and optical signals two-dimensionally. By changing the directions in which the cells are connected, it is possible to transmit electrical signals and optical signals to any positions in the plane.

The arrangement of the cells 110*a*, 110*b*, . . . of this embodiment is exemplary. The cells may be connected at any positions in the same plane, so that the packaging system 102 can extend to form any configuration in the plane. In addition, any number of cells may be provided, and thus the packaging system may have any desired size.

Fourth Embodiment

Figure 8:
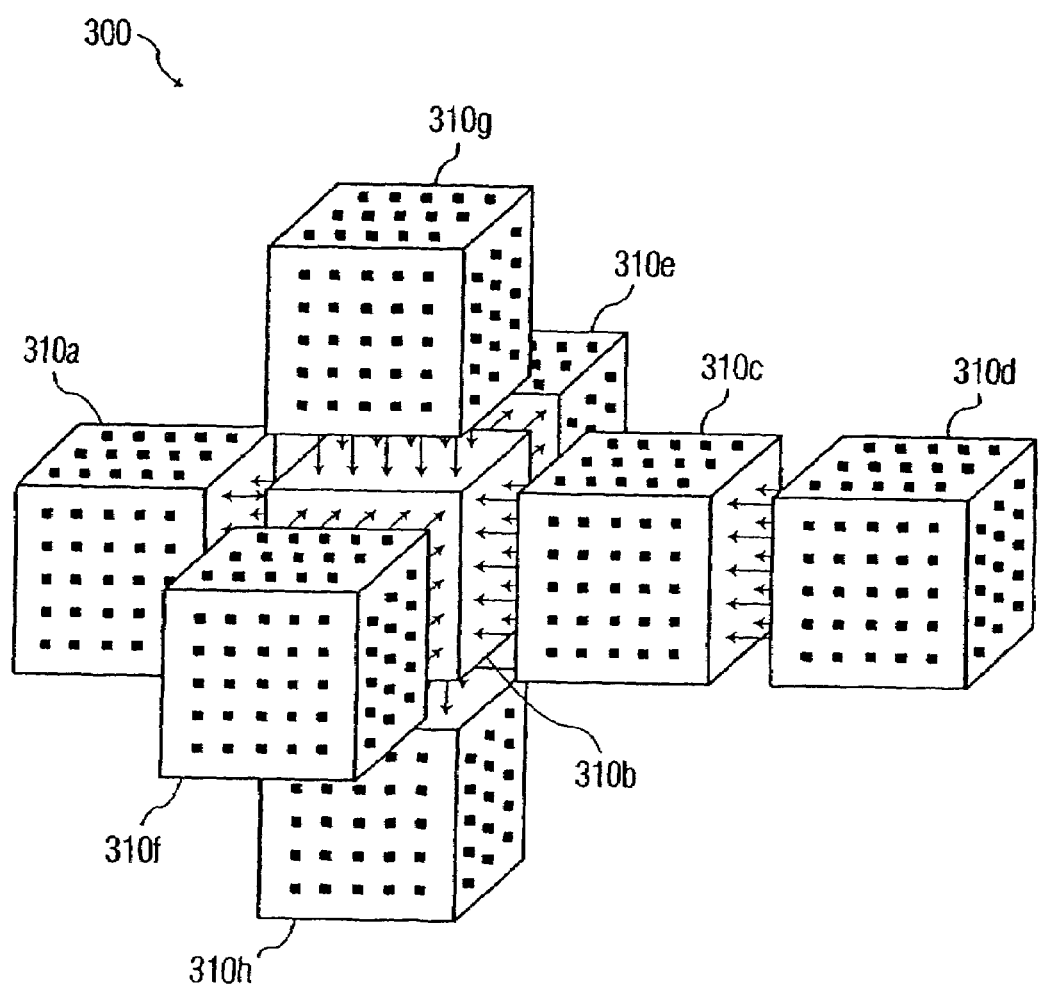
FIG. 8 is a perspective view schematically illustrating a packaging system according to a fourth embodiment.

FIG. 8 is a perspective view schematically illustrating a packaging system 300 according to a fourth embodiment. The packaging system 300, expanding three-dimensionally, uses cubic cells 310*a*, 310*b*, . . . each having first through sixth connectors formed respectively on the six faces thereof. The fifth and sixth connectors are complementary to each other, and each includes electrical connectors and optical devices. In the cells 310*a*, 310*b*, . . . used in this embodiment, electrical connectors and optical devices (optical device arrays), arranged in five lines, form a single connector. The first to sixth connectors form an interconnect system.

The packaging system 300 of this embodiment is formed by connecting the eight cells 310*a*, 310*b*, . . . , with the cell 310*b* being the center. The four cells 310*a* to 310*d* are connected linearly by their first and second connectors in the side-to-side direction in the figure. In addition, the fourth connector of the cell 310*b* is coupled to the third connector of the cell 310*f*, and the third connector of the cell 310*b* is coupled to the fourth connector of the cell 310*e*, so that the cells 310*b*, 310*e*, and 310*f* are connected together orthogonally with respect to the line formed by the four cells 310*a*, 310*b*, 310*c* and 310*d*.

Moreover, the fifth connector of the cell 310*b* is coupled to the sixth connector of the cell 310*g*, and the sixth connector of the cell 310*b* is coupled to the fifth connector of the cell 310*h*, thereby allowing the packaging system 300 to expand upward and downward from the plane made up of the cells 310*a* through 310*f*.

Like the cells of the third embodiment, the cells 310*a*, 310*b*, . . . of this embodiment are detachably engaged and thus connected with each other, such that any of the cells 310*a*, 310*b*, . . . can be easily removed for replacement with another cell.

The cells, the packaging system, and the packaging system fabrication method of this embodiment provide the following effects in addition to the effects described in the second embodiment.

Since the plurality of cells 310*a*, 310*b*, . . . are arranged there-dimensionally to expand spatially, with the central cell 310*b* being the center, the packaging system 300 of this embodiment is capable of transmitting electrical signals and optical signals three-dimensionally. By changing the directions in which the cells are connected, it is possible to transmit electrical signals and optical signals to any positions in the three dimensions.

The arrangement of the cells 310*a*, 310*b*, . . . of this embodiment is exemplary. The cells may be connected at any positions, and the packaging system 300 may expand three-dimensionally to have any configuration. In addition, any number of cells may be provided, and therefore the packaging system may have any desired size.

Fifth Embodiment

Figure 9:
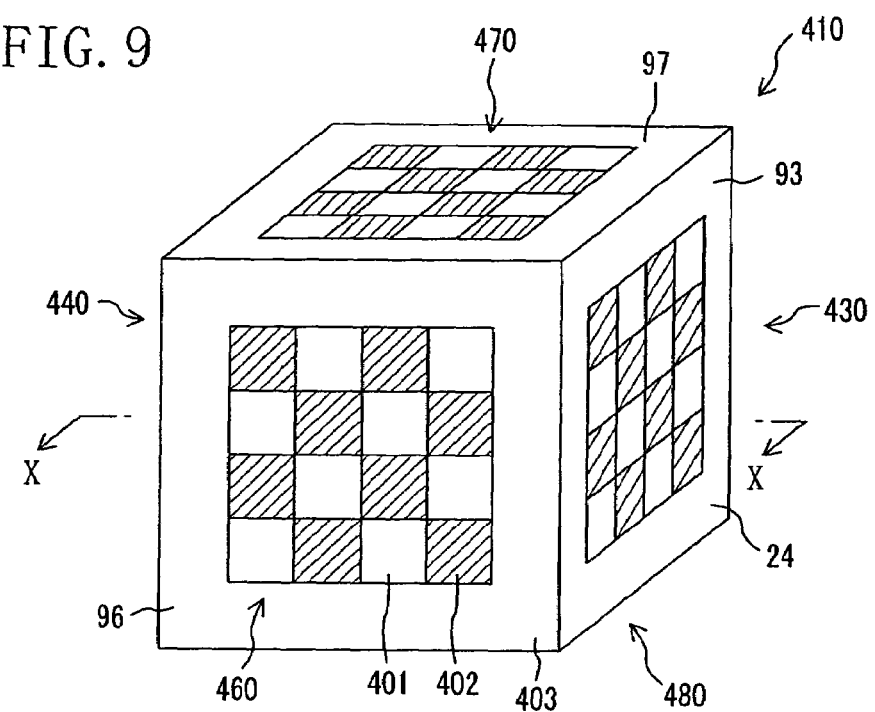
FIG. 9 is a perspective view schematically illustrating a cell according to a fifth embodiment.

As schematically shown in FIG. 9, a cell according to this embodiment has first to sixth connectors 430, 440, 450, 460, 470, and 480 formed on faces 93, 96, and 97 of the cubic body thereof. These connectors form an interconnect system.

The first to sixth connectors 430, 440, 450, 460, 470, and 480 of the cell 410 of this embodiment include a plurality of projections 401, 401, . . . (indicated by open squares) protruding from the outer surfaces 93, 96, . . . of the body 24, and a plurality of recesses 402, 402, . . . (represented by hatched squares), which are surrounded by the projections 401, 401, . . . and depressed relatively. In each of the outer surfaces 93, 96, . . . of the body 24, eight projections 401, 401, . . . and eight recesses 402, 402, . . . are arranged alternately so as to form a checkered pattern. In other words, in each surface, a 4×4 matrix is formed. A peripheral wall 403 is provided around each of the connectors 430, 440, 450, 460, 470, and 480.

Figure 10:
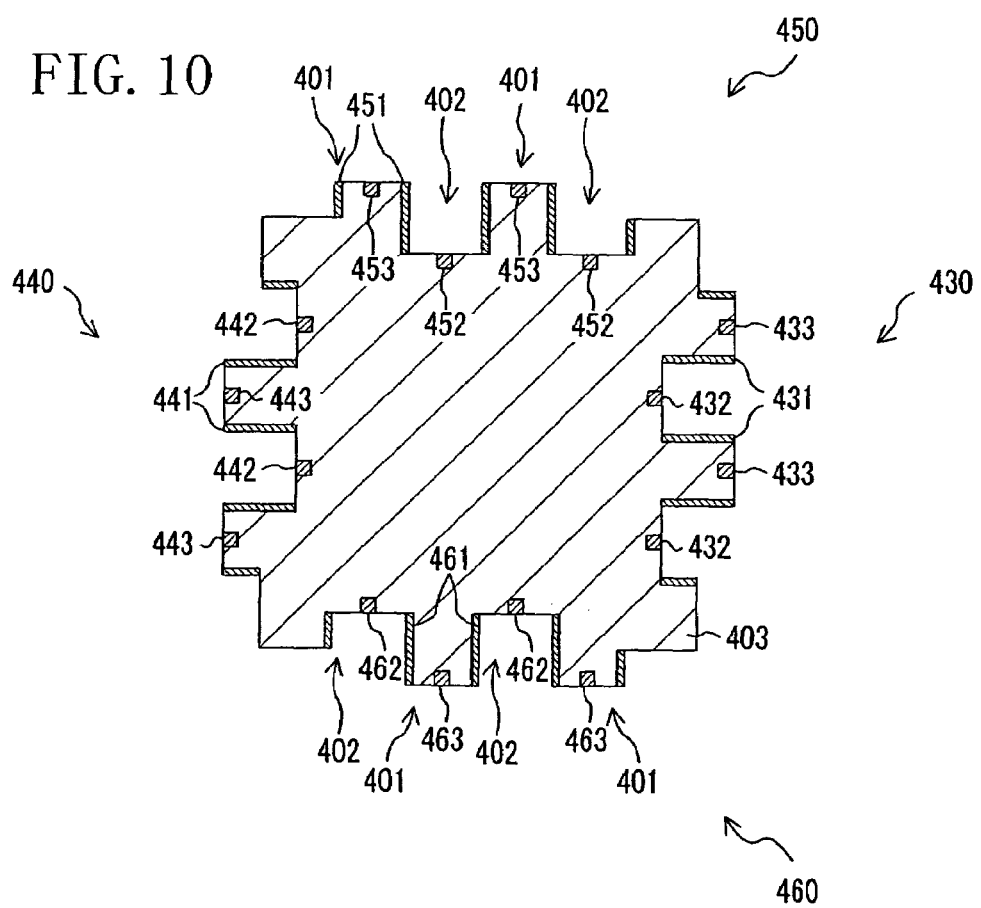
FIG. 10 is a cross-sectional view taken along the line X-X of FIG. 9.

FIG. 10 is a cross-sectional view taken along the line X-X of FIG. 9. In the first thorough fourth connectors 430, 440, 450, and 460, light emitting devices 433, 443, 453, and 463 are provided in the tips of the projections 401, while light receiving devices 432, 442, 452, and 462 are provided in the bottoms of the recesses 402. In each connector, these light emitting devices and light receiving devices together form an optical device array. Provided on the sidewalls of the projections 401 and recesses 402 are first through fourth electrical connectors 431, 441, 451, and 461. Although not shown, an integrated circuit is embedded in the body 24 and connected to each of the electrical connectors. Some of the light emitting devices and light receiving devices are also connected to the integrated circuit, while other light emitting devices and light receiving devices are connected with other light emitting devices or light receiving devices.

Figure 11:
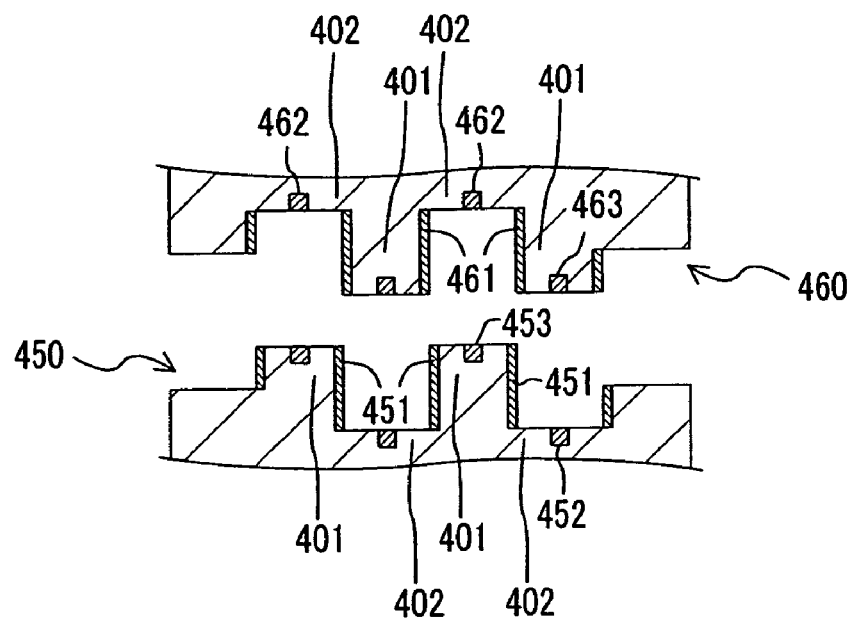
FIG. 11 is a cross sectional view for explaining connections between connectors.

The first and second connectors 430 and 440 are complementary to each other, and the third and fourth connectors 450 and 460 are complementary to each other. That is, as shown in FIG. 11, it is possible to engage, for example, the third and fourth connectors 450 and 460 with each other by disposing the third and fourth connectors 450 and 460 in face-to-face relation and bringing them close to each other, and then by inserting the projections 401 of the third connector 450 and the projections 401 of the fourth connector 460 into the recesses 402 of the fourth connector 460 and the recesses 402 of the third connector 450, respectively. By this engagement, the projections 401 of the third connector 450 fit into the recesses 402 of the fourth connector 460, and the projections 401 of the fourth connector 460 fit into the recesses 402 of the third connector 450, whereby the electrical and mechanical connections are established by the third and fourth electrical connectors 451 and 461. The third and fourth electrical connectors 451 and 461 are formed complementary to each other. Therefore, when the third and fourth connectors 450 and 460 are connected, their 4×4 matrixes are completely engaged with each other and tightly held together.

Furthermore, since the tip of each projection 401 is almost in contact with the bottom of the corresponding recess 402, the light emitting devices 463 and 453 provided in the tips of the projections 401 are almost in contact with the light receiving devices 452 and 462 formed in the bottoms of the recesses 402, allowing optical signal transmission to be carried out reliably. That is, the third optical devices (i.e., the light emitting devices 453 and the light receiving devices 452) provided in the third connector 450 are disposed in the positions complementary to the fourth optical devices (i.e., the light emitting devices 463 and the light receiving devices 462) provided in the fourth connector 460.

Complementary relationship such as the above-described complementary relationship between the third and fourth connectors 450 and 460 is also established between the first and second connectors 430 and 440 and between the fifth and sixth connectors 470 and 480. The joining of these connectors is achieved by detachable engagement, such that any cell can be removed easily.

The cells, the packaging system, and the packaging system fabrication method of this embodiment provide the following effects in addition to the effects of the fourth embodiment.

In this embodiment, since the cells are mechanically connected in a large area, the connection between the cells is tight. Even if each connector is rotated 180 degrees about the central point thereof, the positions of the projections and recesses remain the same, such that the rotated connectors can be connected as they are. As compared with the first to fourth embodiments, the connectors are interlocked more tightly.

In this embodiment, the projections 401 have the light emitting devices in their tips, and the recesses 402 have the light receiving devices in their bottoms. Nevertheless, the light receiving devices may be disposed in the tips of the projections 401, and the light emitting devices may be provided in the bottoms of the recesses 402. Alternatively, the light emitting devices and the light receiving devices may be provided in a mixed manner. For example, in the first and second connectors, the light emitting devices and the light receiving devices may be provided in the projections and the recesses, respectively, while in the third and fourth connectors, the light receiving devices and the light emitting devices may be disposed in the projections and the recesses, respectively.

Although the cells 410 of this embodiment each include the first through sixth connectors 430, 440, . . . , the cells 410 may include only the first and second connectors or the first through fourth connectors. Also, it is not necessary to dispose the optical devices in all of the projections 401 and the recesses 402. The optical devices may be provided in some of the projections 401 and recesses 402.

Although the projections 401 and the recesses 402 form the 4×4 matrixes in the cells 410 of this embodiment, they may form 2×2 or 3×3 matrixes, or 5×5 or greater matrixes. Moreover, the number of rows and the number of columns do not have to be the same in those matrixes.

Sixth Embodiment

Cells according to this embodiment differ from the cells of the fifth embodiment only in terms of the positions of optical devices. In the other aspects, the cells of this embodiment are the same as those of the fifth embodiment. Therefore, the difference will be only described.

Figure 12:
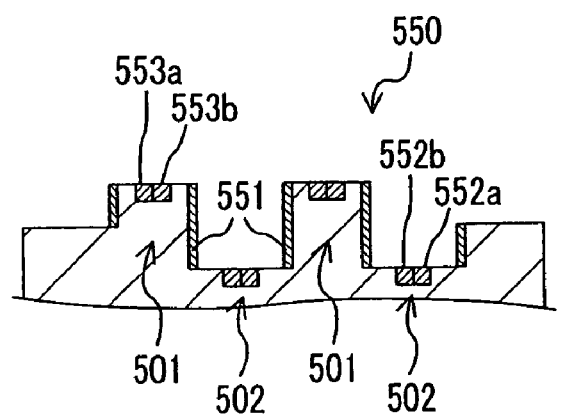
FIG. 12 is a cross sectional view illustrating a third connector of a cell according to a sixth embodiment.

FIG. 12 is a partial cross sectional view of a third connector 550 of this embodiment. As in the fifth embodiment, electrical connectors 551 are formed on the side walls of recesses 502 and projections 501. However, unlike in the fifth embodiment, two optical devices are disposed in the tip of each projection 501 and in the bottom of each recess 502 in this embodiment. More specifically, a pair of a light emitting device 552$a$ and a light receiving device 552$b$ is provided in each recess 502, while a pair of a light emitting device 553$a$ and a light receiving device 553$b$ is provided in each projection 501. In the cell of this embodiment, a pair of a light emitting device and a light receiving device is disposed in the tip of each projection and in the bottom of each recess not only in the third connector 550 but also in all of the first through sixth connectors. Therefore, in a packaging system using the cells of this embodiment, the amount of optical-information transmission doubles as compared with a packaging system using the cells of the fifth embodiment.

Other Embodiments

The present invention is not limited to the foregoing first to sixth embodiments.

The connectors may be connected in different ways. For example, in the first embodiment, the first electrical connectors 31 and 31 and the second electrical connectors 41 and 41 are in contact with each other, and the first and second connectors 30 and 40 are coupled and fixed by static friction between the first electrical connectors 31 and 31 and the second electrical connectors 41 and 41. Nevertheless, the first electrical connectors 31 and 31 and the second electrical connectors 41 and 41 may be formed with projections on the one hand and recesses on the other, for example, and the first and second connectors 30 and 40 may be coupled and fixed by the engagement between those projections and the recesses. Alternatively, engaging portions of different shapes may be formed. The coupling between the third and fourth connectors and between the fifth and sixth connectors may also be carried out likewise.

The first and second optical devices and the other optical devices that protrude from the outer walls of the main body or that are provided in the tips of the projections and in the bottoms of the recesses may be lenses, optical fibers, or other optical media. Alternatively, a diffractive element, a microlens array, or the like may also be used. Since a diffractive element and a microlens array can be fabricated with high precision by processing a silicon substrate, it is preferable to use these high-precision and low-cost components. Utilization of a diffractive element in combination with a microlens array allows the distance between a light emitting device and a light receiving device to be extended, while permitting the cell size to be reduced.

The light emitting devices are not limited to light emitting diodes, but may be lasers or the like. The light receiving devices are not limited to photosensors, but may be image devices or the like. In the first through fourth embodiments, the shapes of the first through sixth electrical connectors are not limited to a rectangular prism, but may be a circular cylinder, a prism, a pyramid, a truncated cone, or the like.

The type of the integrated circuit embedded in the body is not limited to any particular type, and may be, e.g., a CPU, an MPU, or the like, or may be a FPGA (field programmable gate array) or the like.

Any heat generated in each cell can be dissipated from the surfaces of the body and then removed easily by fans. In addition, each cell may be provided with a heat sink.

The shape of the body is not limited to a cube, but may be any polyhedron. For example, the body may have the shape of a tetrahedron, a rectangular parallelepiped, an octahedron, or the like, or may have the shape of a polyhedron in which some of the surfaces are curved. The length of each side of the cells is preferably from 1 mm to 500 mm. For example, the length of each side is 10 mm in the first embodiment, and 20 mm in the second through sixth embodiments. The electrical connectors that protrude from the body are preferably from 0.1 mm to 50 mm in length. For example, those protruding portions have a length of 1.5 mm in the first embodiment, and a length of 2 mm in the second to fourth embodiments. The height of the projections and the depth of the recesses in the fifth and sixth embodiments are preferably from 0.1 mm to 50 mm. For example, the projection height and the recess depth are 2 mm in the fifth embodiment. Also, in each surface of the cells, the distance between adjacent optical devices is preferably from 0.1 mm to 50 mm. For example, the distance is 2 mm in the second to fourth embodiments. Moreover, the bodies may be made of material other than synthetic resin, for example, ceramic.

When complementary connectors are coupled together, the distance between the tips of the opposed optical devices may be 0 mm, (which means that these optical devices may be in contact with each other), or there may be a gap between the tips and the gap may be from 0 mm to 50 mm.

The cells to be connected may be of the same kind, or different kinds of cells may be connected. In the case of connecting different kinds of cells, the shapes of connectors must be examined in advance to make sure that complementary connectors are connected to each other. The connectors to be connected do not have to be of the same size, but are only required to be partially complementary to each other. For instance, the cell of the first embodiment may be connected to the cell of the second embodiment. Moreover, as the cells of the fifth embodiment, a cell having matrixes of 4 projections and 4 recesses and a cell having matrixes of 6 projections and 6 recesses may be connected to each other, in which case the electrical connectors and the optical devices that are not coupled do not perform signal transmission.

Not all of the optical devices provided on the cells have to be either light emitting devices or light receiving devices; some may instead be replaced with light-transmitting portions or light-receiving portions, or with components that do not emit/receive light. If some optical devices are replaced with light-transmitting portions or light-receiving portions, it is, for example, possible for the cells having those portions to receive light, pass the light through the body, and emit the light to the next cell. Also, if, in a cell, components that do not emit/receive light are provided in place of some optical devices, optical coupling is not established in the portion/portions of the cell where the connecter/connectors having those components is formed. If such cells are mixed in the fourth embodiment, for example, connections between cells optically coupled, and connections between cells not optically coupled are mixed. Furthermore, in order to improve the configuration of the entire packaging system, dummy cells, which do not contribute to information transmission, may be inserted.

The present invention is directed towards two and three dimensional integrated circuit packaging systems utilizing modules that contain electrical and optical devices as building blocks. The modules are interconnected via an interconnect system to form integrated circuit architectures tailored to specific applications. The interconnect system of the present invention maximizes signal integrity and speed, thereby providing improved overall system performance. Furthermore, the 2D or 3D packaging system of the present invention provides versatility in fitting into unique and/or small architectural spaces.

The packaging system is constructed from basic units of integrated circuitry. These individual modules each have electrical and optical components embedded within them. The modules may be identical, or alternatively, the components may be customized so that the functionality of each module may differ.

Figure 13A:
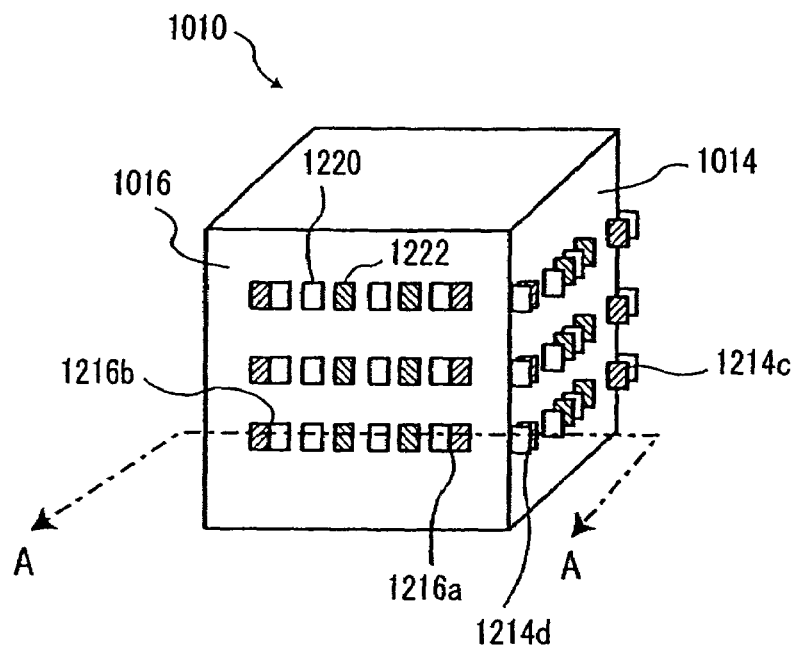
FIG. 13A is a perspective view of an integrated circuit module according to the invention.

As illustrated in FIG. 13A, the module 1010, includes mechanical, electrical and optical interconnections. Specifically shown extending from the side of module 1010, are several elements of the module that make-up the interconnection system. Specifically, two types of connectors are shown 1214, 1216. As described in more detail below, each connector comprises an electrical element and a mechanical element. Also shown are two types of optical elements, an optical emitter, or diode 1220, and an optical detector 1222.

The interconnect system elements on side 1016 are complementary to the elements extending from the orthogonal side 1014. This complementariness is more clearly illustrated in FIG. 14A, which is the cross-sectional view of the module in FIG. 13A along the dotted line labeled A-A.

Figure 14A:
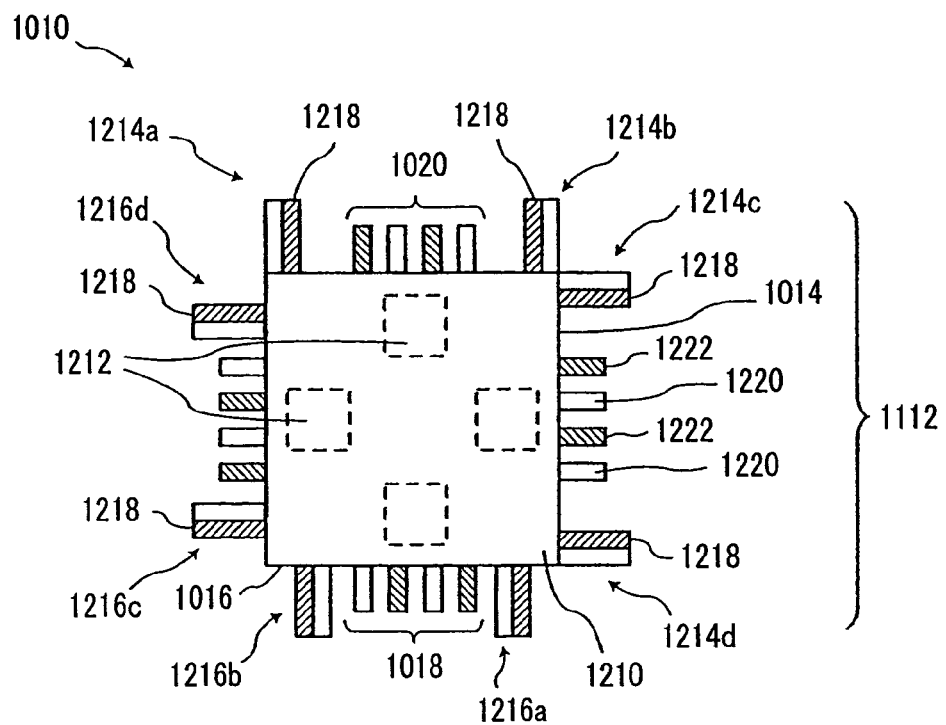
FIG. 14A is a cross-sectional view of the module in FIG. 13A.

The view of FIG. 14A shows that the module 1010 is formed of a substrate 1210, which is formed of any conventional substrate material, such as ceramic, glass, Bakelite®, or epoxy. Embedded within each substrate 1210 is a plurality of components 1212. The type and number of components 1212 embedded within each substrate 1210 of each module 1010 is user defined and customizable. Components 1212 are representative of any logic function or device, such a microprocessor device, field programmable gate array (FPGA) or a memory device, useful in, for example, a computer application. The number and orientation of the electrical and optical connecting elements is exemplary. The electrical connection between one component 1212 and another is accomplished via standard wiring or optical connections within substrate 1210.

As shown in FIG. 14A, the interconnect system 1112 includes optical devices 1018, 1020. The optical devices are made up of a plurality optical elements, including optical emitters 1220, which can be laser diodes, light emitting diodes, or other devices for emitting optical signals at any wavelength and a plurality of photo detectors 1222. Photo detectors 1222 may be conventional semiconductor devices, such as conventional photo diodes or photo transistors that generate electrical signals in response to light energy at any wavelength. The actual active device forming each emitter 1220 may be embedded within substrate 1210 and its light output is directed through the external surface of substrate 1210 via a light transmission medium, such as an optical lens or an optical fiber. The devices 1212 may be connected to the optical emitters 1220 either directly or via a driver circuit (not shown). The devices 1212 may be connected to the photo detectors 1222 either directly or through a preamplifier circuit.

Photo detectors 1222 provide variations in current or voltage as a function of received light intensity. The actual active device forming each photo detector 1222 may be embedded within substrate 1210 and its light input may be directed through the external surface of substrate 1210 via a light transmission medium, such as an optical lens or a fiber optic element. Additionally, photo detectors 1222 perform optical-to-electrical conversion for interfacing with electrical components 1212.

The optical devices are arranged on or near the outer surfaces of substrate 1210, as shown in FIG. 14A, and the precise number and arrangement of fasteners 1214, 1216, electrical conductors 1218, photo emitters 1220, and photo detectors 1222 in the interconnect system may vary according to the desired application.

FIG. 14A also illustrates the fasteners 1214, 1216 of the interconnect system 1112. These fasteners provide the electrical connectors of the interconnect system through electrical conductors 1218. Fasteners 1214, 1216 are mechanical fasteners formed of, for example, ceramic, glass, metal, Bakelite®, or epoxy for interlocking one module to the next. As shown in FIG. 14A, fasteners 1214a and 1214b are positioned at the outer most edge of one side of substrate 1210, while fasteners 1214c and 1214d are likewise positioned at the outer most edge of an adjacent side 1014 of substrate 1210. In contrast, fasteners 1216a and 1216b are positioned slightly inset from the outer most edge of side 1016 of substrate 1210, and fasteners 1216c and 1216d are likewise positioned slightly inset from the outer most edge of the adjacent side of substrate 1210. This configuration demonstrates the complementariness of the fasteners; fasteners 1214 are complementary to fasteners 1216. Although not shown, it is contemplated that one or both of the fasteners 1214 and 1216 may have beveled edges to ease insertion of the fastener 1216 into the fastener 1214 and may also have latching surface to hold the fasteners together once they are joined. For example, each of the surfaces of the electrical conductors 1218 may have a semicylindrical bump that engages with the bump on the complementary connector to hold the modules together while permitting them to be separated.

Alternatively, the fasteners 1216 and 1214 may be configured as shown with the non-metallic portion of the fasteners 1216 and 1214 providing a spring force that merges the electrical conductor portions 1218 together when the fasteners 1216 and 1214 are joined in a press-fit configuration.

Table 1 provides example dimensions for a module 1010 designed for use in a two-dimensional integrated circuit packaging system of the present invention.

TABLE 1

|  | Range | Specific example |
| --- | --- | --- |
| Substrate 1210 length | 1 to 500 mm | 20 mm |
| Substrate 1210 width | 1 to 500 mm | 20 mm |
| Substrate 1210 height | 1 to 500 mm | 20 mm |
| Fastener 1214 length | 0.1 to 50 mm | 2 mm |
| Fastener 1216 length | 0.1 to 50 mm | 2 mm |
| Optical interconnect system 1112 pitch | 0.1 to 50 mm | 2 mm |
| Electrical conductor 1218 thickness | 0.1 to 100 µm | 1 µm |
| Gap "g" | 0 to 50 mm | 2 mm |

Figure 13B:
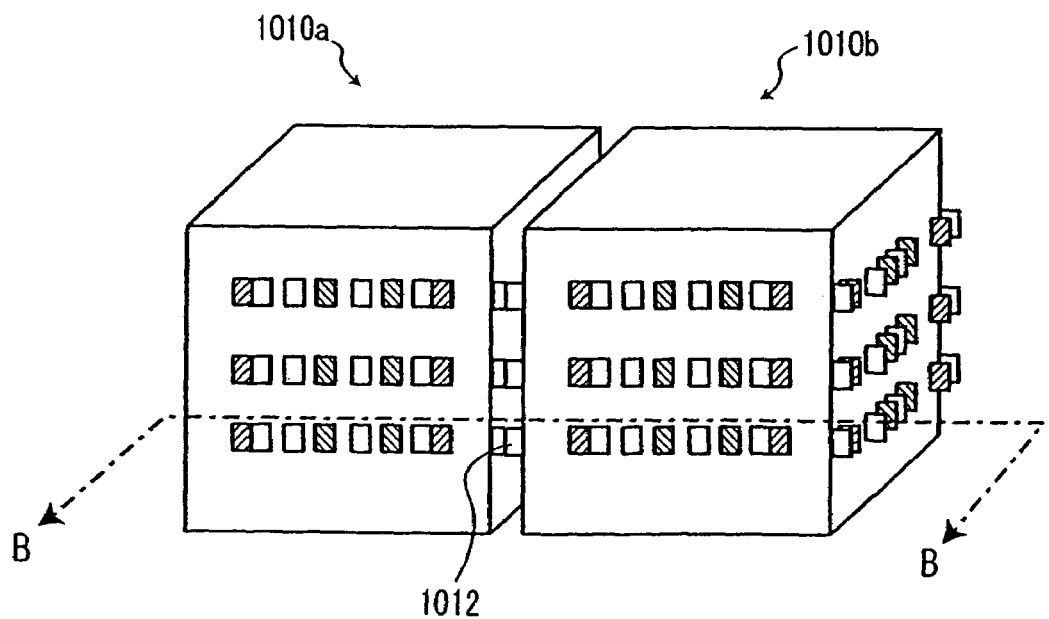
FIG. 13B is a perspective view of two adjacent integrated circuit modules according to the invention.
Figure 14B:
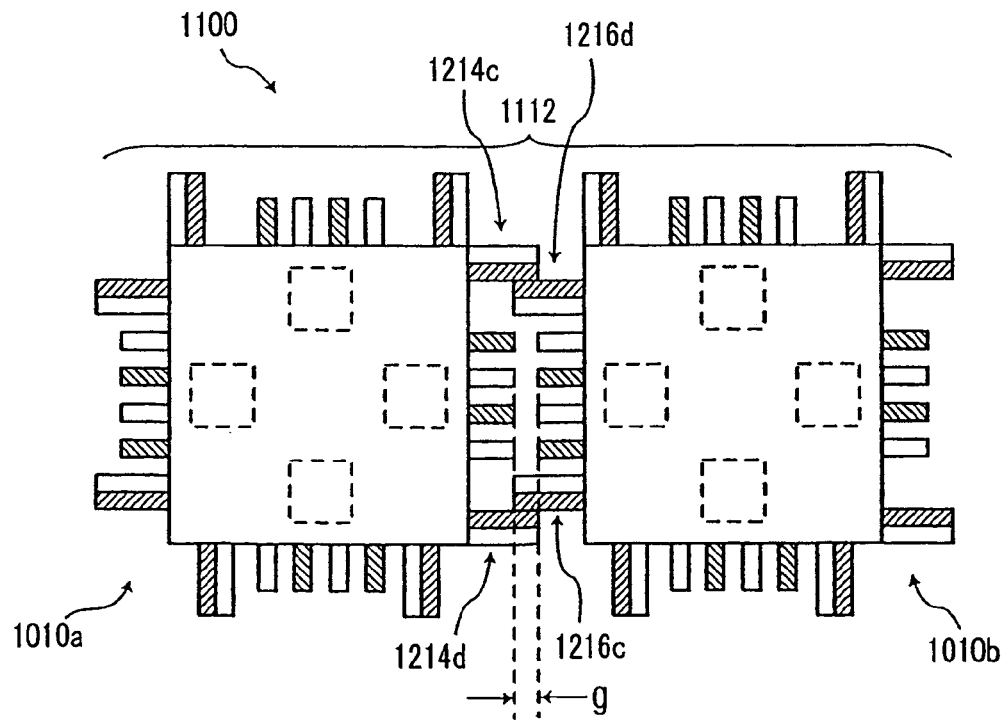
FIG. 14B is a cross-sectional view of the modules in FIG. 13B.

Complementary fasteners may be interlocked as illustrated in FIG. 14B. FIG. 14B shows the cross-sectional view along line B-B of FIG. 13B. FIG. 13B illustrates two modules 1010a and 1010b interconnected through the interconnect system. The two modules 1010a, 1010b are connected via an attachment 1012 between the complementary connectors extending from the side of each module.

Details of the attachment are illustrated in FIG. 14B, which shows how the fasteners 1214 and 1216 are positioned to form an electrical connection. Each fastener has an electrical conductor element 1218, and the electrical conductors make contact when an attachment is formed. Thus, in the example shown in the figures, the fasteners 1216, 1214 are electrical connectors between the modules. In this example, each inner surface of fasteners 1214 and each outer surface of fasteners 1216 contains an electrical conductor 1218 for transferring electrical signals, including operational power signals, from one module 1010a to the next 1010b. Electrical conductors 1218 may be formed from any electrically conducting material, such as copper or aluminum and may be gold plated to inhibit corrosion.

When modules 1010a, 1010b are assembled within a packaging system 1100, complementary optical devices 1018 and 1020 are positioned by the interconnect system attachment such that optical signals can be transmitted between the modules 1010a and 1010b. In FIG. 14B, the diodes 1220 and photo detectors 1222 are aligned permitting the light output of each diode 1220 to be coupled to the input of an associated photo detector 1222. This optical coupling propagates signals from one module 1010 and the next interlocking module 1010.

FIG. 14B generally illustrates how the elements of optical interconnect system 1112 align and engage. The fasteners 1216c and 1216d of module 1010b are engaged between fasteners 1214c and 1214d of module 1010a. The electrical conductors 1218 of fasteners 1216c and 1216d of module 1010b are respectively in mechanical and electrical contact with electrical conductors 1218 of fasteners 1214c and 1214d of module 1010a. The fasteners serving as electrical connectors providing connections from electrical signals between from module 1010a to module 1010b. Generally, fasteners on any given module engage in like manner with fasteners of an adjacent module.

Similarly, FIG. 14B shows optical emitters 1220 of module 1010a aligned with photo detectors 1222 of module 1010b. Likewise, optical emitters 1220 of module 1010b are aligned with photo detectors 1222 of module 1010a. A gap g exists between the optical devices 1020 and 1018 when modules 1010a and 1010b are connected. Where g is greater than zero, the optical beam of emitters 1220 is transmitted across free space. Signal transmission between adjacent modules is possible across the gap g via the optical devices within interconnect system 1112. A microlens array either alone or combined with a diffractive optical element (DOE) may be used in order to enhance the propagation of optical signals between modules or in order to split the signal from one emitter and direct it to multiple receivers. A DOE is a diffractive element fabricated by conventional photolithography and etching technology commonly used in the silicon large-scale integration (LSI) industry. Utilization of a DOE in combination with a microlens array can allow the transmission distance between emitter and receiver to be extended over what could be achieved using a microlens alone. In this case, a DOE/microlens combination is positioned between emitters 1220 and photo detectors 1222. By using a microlens array, a packaging system with yet a smaller volume may be obtained.

Customization of the integrated circuit apparatus may be accomplished through customization of the individual modules or in combination with the assembly of multiple modules interconnected in the system. Thus, the packaging system provides for user-defined customization. For example, electrical conductors 1218, emitters 1220, and photo detectors 1222 need not be oriented exactly as shown in the figures. Rather, these elements may differ in selection, number and location on the modules as determined by the specific application. The interconnections between the modules, for example, may form buses allows some signals to pass through the module to other modules. The interconnections may also be application configurable, depending on the designed use of the packaging system 1100. Each emitters 1220 and photo detector 1222 is suitably placed on a surface of the module 1010 to provide suitable communicate between modules. In one embodiment, suitable positions for optical coupling are determined automatically, without manual adjustment, by the height of fasteners 1214 and 1216. Additionally, modules are preferably easily detachable to enable the function within the total packaging system 1100 to be easily changed. Because no leads are not necessary to establish electrical connections between modules, the architecture of the packaging system is environmentally conservative.

Figure 15:
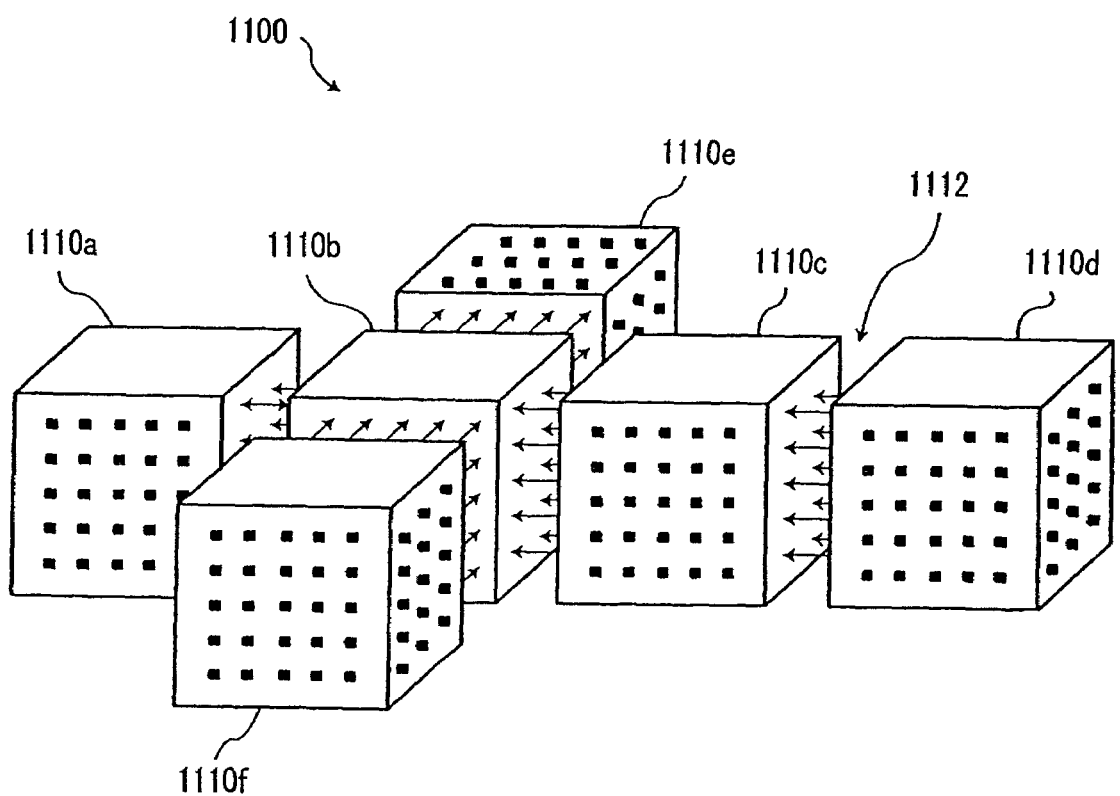
FIG. 15 is a perspective view of a two-dimensional integrated circuit apparatus according to the invention.

Referring to FIG. 15, an example integrated circuit apparatus architecture formed from interconnected modules is illustrated. The packaging system 1100 is a two-dimensional configuration of modules assembled into an integrated circuit packaging apparatus. The plurality of modules 1110 that include electrical components 1212 are designed according to any user-defined specifications depending on the overall desired function or application. Each module 1110 is designed to fit within a specific X-Y location within the 2D packaging system. Accordingly, the modules have sets of interconnection systems extending to connect with adjacent modules. Each module 1110 is oriented such that fasteners 1214 of one module 1110 are mechanically and electrically coupled to fasteners 1216 of an adjacent module 1110. Specifically, one side of module 1110a is mechanically, electrically, and optically coupled to a first side of module 1110b; one side of module 1110e is coupled to a second side of module 1110b; one side of module 1110c is coupled to a third side of module 1110b; and one side of module 1110f is coupled to a fourth side of module 1110b. Furthermore, a second side of module 1110c is coupled to one side of module 1110d. These multiple interconnections combine to form a single integrated circuit architecture shown in FIG. 15. The interconnect system allows flexibility in assembly the modules 1110 in the X and Y planes. The interconnected modules allows operational power signals to be distributed from one module to the next via electrical connectors, and provides signal transmission from one module to the next via photo emitters and photo detectors.

Generally, the power distribution to each component 1212 of a module is accomplished through electrical conductors from a power source (not shown). Furthermore, one or more components 1212 may be power-generating devices using, for example, extracting power from either a magnetic field or an electric field, or may include specific energy exchanging components (e.g. a photo cell). Any heat generated by components 1212 within each module may be dissipated by radiating to the surfaces of the module and subsequently removed via any cooling method, such as external fans. Additionally, heatsink devices (not shown) may be used within the packaging system 1100. Furthermore, it is contemplated that if the interconnect system 1112 is formed using heat conducting materials (e.g. diamond films) it may also serve as a heatsink.

Figure 16:
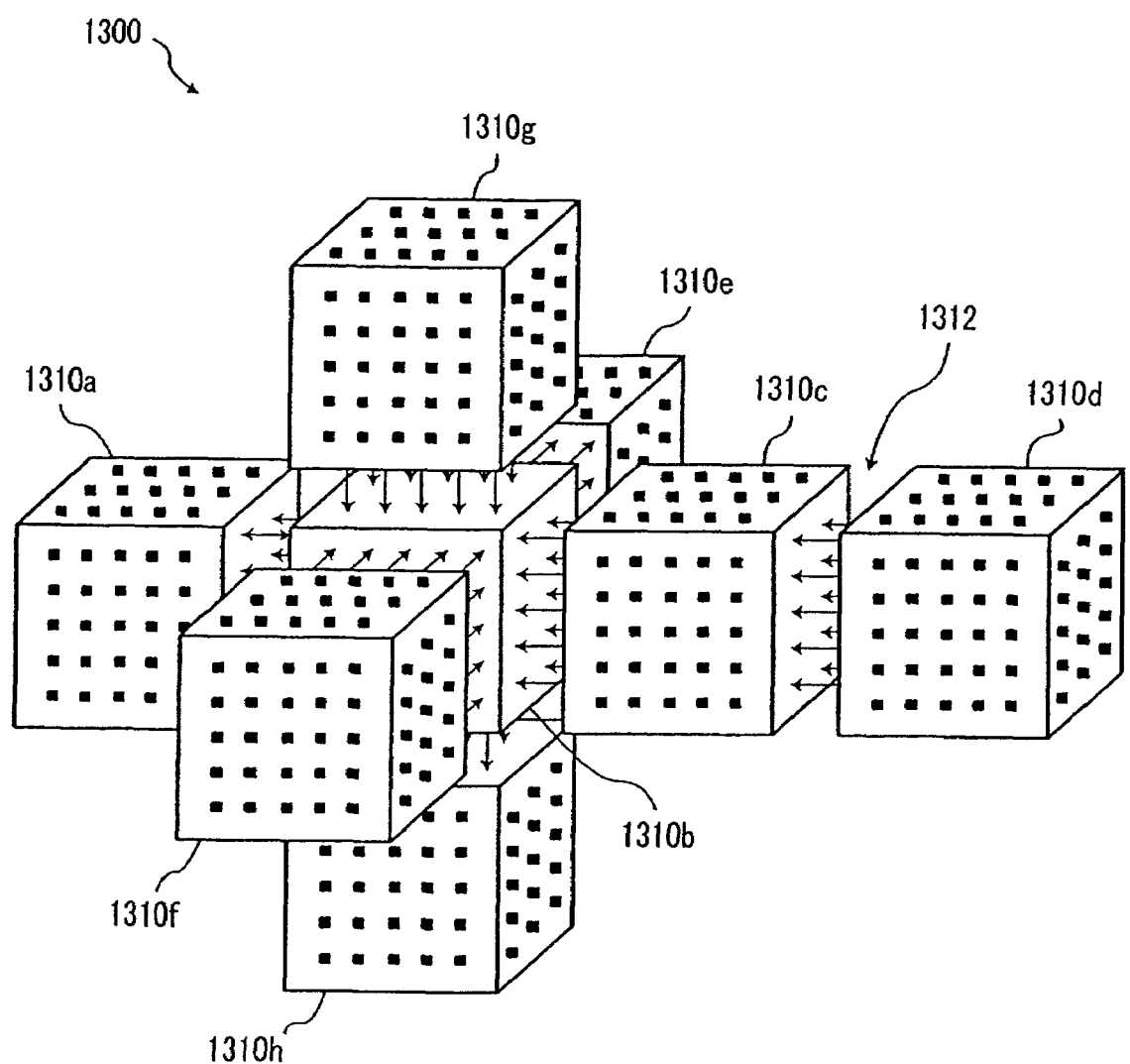
FIG. 16 is a perspective view of a three-dimensional integrated circuit apparatus according to the invention.

As shown in FIG. 16, the interconnection system may be used to a form three-dimensional integrated circuit packaging apparatus. A perspective view of an exemplary 3D packaging system 1300 is shown in FIG. 16. The 3D packaging system 1300 includes a plurality of modules 1310 arranged and electrically connected in the X-Y-Z planes. Modules 1310 are connected by the optical interconnect system 1312, which provides signal and power connections to adjacent modules in any orientation. More specifically, the 3D packaging system 1300 of FIG. 16 includes modules 1310a, 1310b, 1310c, 1310d, 1310e, 1310f, 1310g, and 1310h arranged in one exemplary configuration. The packaging system is not limited to any particular configuration, as any number of modules can be arranged in any X-Y-Z arrangement.

Similar to the modules discussed above in the two dimensional configuration, each module 1310 has electrical and/or optical components embedded within it. The components can vary to accommodate particular purposes, or be generic building block components (e.g. FPGA's) allowing the functionality of each module to be determined by the user. As a result, the function of modules 1310 collectively within the 3D packaging system 1300 is entirely customizable and user defined.

As apparent from FIG. 16, all six sides of each cubic module 1310 may include the interconnect system extending from the exterior of the module. Mechanical, electrical, and optical interconnections are formed by the complementary interconnect systems on adjacent modules. The modules 1310 are similar to modules 1110 as described above. The key distinction between the modules being that all six sides of modules 1310 have interconnect systems, whereas only four sides are equipped with the interconnect system on modules 1110. Module 1310 includes substrate 1210 having electrical optical or electrooptic components 1212 embedded therein, and the interconnect system 1312 may be identical to optical interconnect system 1112, as described in FIGS. 14A and 14B. Specifically, the interconnect system 1312 includes fasteners 1214, fasteners 1216, electrical conductors 1218, photo emitters 1220, and photo detectors 1222, as described in FIGS. 14A and 14B. Similarly, each photo emitter 1220 and photo detector 1222 may be suitably placed on the surface of a module 1310 to allow communication between modules 1310.

Similar to the modules 1210 used in 2D architectures, the modules 1310 may be designed according to any user-defined specifications depending on the overall desired function or application. Each module 1310 may be designed to fit within a specific location within the 3D packaging system 1300. The modules 1310 are oriented within the 3D packaging system 1300 to provide coupling through the interconnect systems to an adjacent module 1310.

With reference to the example configuration of FIG. 16, one side of module 1310a is mechanically, electrically, and optically coupled to a first side of module 1310b; one side of module 1310e is coupled to a second side of module 1310b; one side of module 1310c is coupled to a third side of module 1310b; one side of module 1310f is coupled to a fourth side of module 1310b; one side of module 1310g is coupled to a fifth side of module 1310b; and one side of module 1310h is coupled to a sixth side of module 1310b.

Furthermore, a second side of module 1310c is coupled to one side of module 1310d. The result is a three-dimensional structure of integrated circuits. A variety of 3D structures are obtainable by connecting modules 1310. Power is distributed from one module to the next via electrical connectors of the fasteners and 1216. Furthermore, signals are transmitted from one module to the optical devices.

Table 2 provides example dimensions for a module 1310 designed for use in a three-dimensional integrated circuit packaging system according to the present invention.

TABLE 2

|  | Range | Specific example |
| --- | --- | --- |
| Substrate 1210 length | 1 to 500 mm | 20 mm |
| Substrate 1210 width | 1 to 500 mm | 20 mm |
| Substrate 1210 height | 1 to 500 mm | 20 mm |
| Fastener 1214 length | 0.1 to 50 mm | 2 mm |
| Fastener 1216 length | 0.1 to 50 mm | 2 mm |

TABLE 2-continued

| | Range | Specific example |
|---|---|---|
| Optical interconnect system 1312 pitch | 0.1 to 50 mm | 2 mm |
| Electrical conductor 1218 thickness | 0.1 to 100 µm | 1 µm |
| Gap "g" | 0 to 50 mm | 0 mm |

In summary, the 2D packaging system 1100 and the 3D packaging system 1300 of the present invention provide easily configurable electrical packaging. The system allows for unique 2D or 3D integrated circuit configurations by connecting modules. Furthermore, the use of optical coupling via photo emitters and photo detectors ensures maximum signal transmission speed and signal integrity beyond the capabilities of conventional wired interconnect systems, while minimizing EMI and crosstalk.

The architecture of the packaging systems is not limited to small components. The architecture principles apply generally to large substrates, for example, within a server or personal computer application. Additionally, while not illustrated in the figures, the modules may be of any multi-sided shape, for example, pyramidal or hexagonal, with the appropriate adjustment to the interconnect system components to maintain complementariness of adjacent modules.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A cell for transmitting optical information, the cell comprising:
   a body and an interconnect system protruding from the body,
   wherein the interconnect system includes a first connector and a second connector that are complementary to each other;
   the first connector includes a first electrical connector and a first optical device;
   the second connector includes a second electrical connector complementary to the first electrical connector and a second optical device disposed in a position complementary to the first optical device, such that the second connector is configured to be directly electrically and optically connected to the first connector of another cell having the same interconnect system; and
   the first optical device is a light emitting device and the second optical device is a light receiving device.

2. The cell of claim 1, wherein the interconnect system extends from the exterior of the body of the cell outwardly of, and inwardly into, the body.

3. The cell of claim 1, wherein the body has a polyhedral structure, and the first and second connectors are provided on a first face and a second face of the body, respectively, and
   the interconnect system further includes a third connector and a fourth connector provided on a third face and a fourth face of the body, respectively, the third and fourth connectors being complementary to each other.

4. The cell of claim 3, further comprising a fifth connector and a sixth connector provided on a fifth face and a sixth face of the body, respectively, the fifth and sixth connectors being complementary to each other.

5. A cell for transmitting optical information, the cell comprising:
   a body and an interconnect system protruding from the body,
   wherein the interconnect system includes a first connector and a second connector that are complementary to each other;
   the first connector includes a plurality of first electrical connectors and a plurality of first optical devices;
   the second connector includes a plurality of second electrical connectors complementary to the first electrical connectors and a plurality of second optical devices disposed in positions complementary to the first optical devices, such that the second connector is configured to be directly electrically and optically connected to the first connector of another cell having the same interconnect system; and
   the first and second optical devices include light emitting devices and light receiving devices.

6. The cell of claim 5, wherein the interconnect system extends from the exterior of the body of the cell outwardly of, and inwardly into, the body.

7. The cell of claim 5, wherein the body has a polyhedral structure, and the first and second connectors are provided on a first face and a second face of the body, respectively, and
   the interconnect system further includes a third connector and a fourth connector provided on a third face and a fourth face of the body, respectively, the third and fourth connectors being complementary to each other.

8. The cell of claim 7, further comprising a fifth connector and a sixth connector provided on a fifth face and a sixth face of the body, respectively, the fifth and sixth connectors being complementary to each other.

9. The cell of claim 5, wherein the first and second connectors include a plurality of projections protruding from the exterior of the body and a plurality of recesses that are surrounded by the projections and depressed relatively;
   the projections and the recesses are arranged to form checkered patterns on the exterior of the body on which the first and second connectors are provided;
   the first optical devices includes one disposed in the tip of at least one of the projections of the first connector and one disposed in the bottom of at least one of the recesses of the first connector; and
   the second optical devices include one disposed in the tip of at least one of the projections of the second connector and one disposed in the bottom of at least one of the recesses of the second connector.

10. The cell of claim 9, wherein the first optical device disposed in the tip of said at least one projection of the first connector is a light emitting device, and
    the second optical device disposed in the bottom of said at least one recess of the second second connector is a light receiving device.

11. The cell of claim 9, wherein the first optical device disposed in the tip of said at least one projection of the first connector is a light receiving device, and
    the second optical device disposed in the bottom of said at least one recess of the second connector is a light emitting device.

12. The cell of claim 9, wherein the first optical device disposed in the tip of said at least one projection of the first connector is at least a pair of a light emitting device and a light receiving device, and the second optical device disposed in the bottom of said at least one recess of the second connector is at least a pair of a light receiving device and a light emitting device.

13. The cell of claim 9, wherein the body has a polyhedral structure, and the first and second connectors are provided on a first face and a second face of the body, respectively;

the interconnect system further includes a third connector and a fourth connector provided on a third face and a fourth face of the body, respectively, the third and fourth connectors being complementary to each other;

the third and fourth connectors include a plurality of projections protruding from the exterior of the body and a plurality of recesses that are surrounded by the projections and depressed relatively; and the projections and the recesses of the third and fourth connectors are arranged to form checkered patterns on the exterior of the body on which the third and fourth connectors are provided.

14. The cell of claim 13, further comprising a fifth connector and a sixth connector provided on a fifth face and a sixth face of the body, respectively, the fifth and sixth connectors being complementary to each other;

the fifth and sixth connectors include a plurality of projections protruding from the exterior of the body and a plurality of recesses that are surrounded by the projections and depressed relatively; and the projections and the recesses of the fifth and sixth connectors are arranged to form checkered patterns on the exterior of the body on which the fifth and sixth connectors are provided.

15. A packaging system comprising at least two cells for transmitting optical information, wherein:

each of the cells includes at least one electronic or electro-optical component, at least one first connector, and at least one second connector complementary to the first connector;

each first connector is substantially identical for every cell and each second connector is substantially identical for every cell;

the cells are directly connected by a couple between the first connector and the second connector;

the connection established between the cells allows the two adjacent cells to be coupled mechanically, electrically, and optically;

the first connector includes a first optical device array and the second connector includes a second optical device array;

each of the first and second optical device arrays includes a light emitting device and a light receiving device; and the first and second optical device arrays are arranged so that the light emitting device of the first optical device array of one of the cells transmits optical information to the light receiving device of the second optical device array of the other cell, and the light emitting device of said second optical device array transmits optical information to the light receiving device of said first optical device array, whereby optical information transmission is carried out between said one cell and said the other cell.

16. The packaging system of claim 15, wherein the cells are connected detachably.

17. The packaging system of claim 16, wherein the cells are connected to be arranged two-dimensionally.

18. The packaging system of claim 16, wherein the cells are connected to be arranged three-dimensionally.

19. The packaging system of claim 15, wherein the first connector includes a first electrical connector and the second connector includes a second electrical connector, and the cells are also mechanically coupled by the first and second electrical connectors.

20. The packaging system of claim 15, wherein the light emitting device of the first optical device array of said one cell is spaced apart from the light receiving device of the second optical device array of said the other cell, and the light emitting device of the second optical device array of said the other cell is spaced apart from the light receiving device of the first optical device array of said one cell.

21. The packaging system of claim 20, wherein each space is from 0 mm to 50 mm.

22. A method for fabricating a packaging system by connecting a plurality of cells for transmitting optical information, each cell including a body and an interconnect system protruding from the body, wherein the interconnect system includes a first connector and a second connector that are complementary to each other, each first connector being substantially identical for every cell and each second connector being substantially identical for every cell, the first connector includes a first electrical connector and a first optical device, the second connector includes a second electrical connector complementary to the first electrical connector and a second optical device disposed in a position complementary to the first optical device, and the first optical device is a light emitting device and the second optical device is a light receiving device, the method comprising the steps of:

disposing a first one and a second one of the cells so that the first connector of the first cell faces the second connector of the second cell; and detachably engaging the first connector of the first cell directly with the second connector of the second cell, thereby coupling the first and second connectors.

23. A method for fabricating a packaging system by connecting a plurality of cells for transmitting optical information, each cell including a body and an interconnect system protruding from the body, wherein the interconnect system includes a first connector and a second connector that are complementary to each other, each first connector being substantially identical for every cell and each second connector being substantially identical for every cell, the first connector includes a plurality of first electrical connectors and a plurality of first optical devices, the second connector includes a plurality of second electrical connectors complementary to the first electrical connectors and a plurality of second optical devices disposed in positions complementary to the first optical devices, and the first and second optical devices include light emitting devices and light receiving devices, the method comprising the steps of:

disposing a first one and a second one of the cells so that the first connector of the first cell faces the second connector of the second cell; and detachably engaging the first connector of the first cell directly with the second connector of the second cell, thereby coupling the first and second connectors.

* * * * *

UNITED STATES PATENT AND TRADEMARK OFFICE
CERTIFICATE OF CORRECTION

PATENT NO. : 7,438,482 B2  Page 1 of 1
APPLICATION NO. : 11/189673
DATED : October 21, 2008
INVENTOR(S) : Asari et al.

It is certified that error appears in the above-identified patent and that said Letters Patent is hereby corrected as shown below:

At Claim 15, Col. 23 line 45, "couple" should read "coupling".

Signed and Sealed this

Seventeenth Day of March, 2009

JOHN DOLL
*Acting Director of the United States Patent and Trademark Office*